(12) United States Patent
Horiuchi et al.

(10) Patent No.: US 8,953,027 B2
(45) Date of Patent: Feb. 10, 2015

(54) STEREOSCOPIC-IMAGE DISPLAY APPARATUS AND STEREOSCOPIC EYEWEAR

(75) Inventors: Hiroyuki Horiuchi, Osaka (JP); Yoshinori Seki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/989,466

(22) PCT Filed: Dec. 28, 2011

(86) PCT No.: PCT/JP2011/080450
§ 371 (c)(1),
(2), (4) Date: May 24, 2013

(87) PCT Pub. No.: WO2012/093641
PCT Pub. Date: Jul. 12, 2012

(65) Prior Publication Data
US 2013/0242068 A1 Sep. 19, 2013

(30) Foreign Application Priority Data

Jan. 7, 2011 (JP) ................................. 2011-001714
Dec. 27, 2011 (JP) ................................. 2011-286312

(51) Int. Cl.
*H04N 15/00* (2006.01)
*G09G 5/00* (2006.01)
(Continued)

(52) U.S. Cl.
CPC ........ *H04N 13/0429* (2013.01); *G02B 27/2228* (2013.01); *G03B 35/16* (2013.01);
(Continued)

(58) Field of Classification Search
USPC ................ 348/42, 51–56; 359/376, 458, 466; 382/115, 103; 345/633
See application file for complete search history.

(56) References Cited

U.S. PATENT DOCUMENTS 6,791,599 B1   9/2004 Okada et al.
8,411,907 B2 * 4/2013 Nelson et al. ................. 382/115
(Continued)

FOREIGN PATENT DOCUMENTS

JP     11-75223 A    3/1999
JP     11-98538 A    4/1999
(Continued)

OTHER PUBLICATIONS

"3DC Safety Guideline", [online], Apr. 20, 2010, 3D consortium safety guideline committee, [search date: Jun. 8, 2010], Internet URL:http://www.3dc.gr.jp/jp/scmt_wg_rep/3dc_guideJ_20100420.pdf, pp. 1-41.

*Primary Examiner* — Gims Philippe
(74) *Attorney, Agent, or Firm* — Birch, Stewart, Kolasch & Birch, LLP

(57) ABSTRACT

In the case of plural viewers viewing the 3D image, it is difficult to implement the display condition requested by the individual viewer without the viewer's burden for manipulating to change to the image requested by the viewer.
A stereoscopic-image display apparatus is provided with a viewer detecting unit that identifies the viewer, and a viewer/stereoscopic eyewear database that stores and manages individual data for each of the viewers and stereoscopic eyewears. The stereoscopic-image display apparatus automatically instructs the stereoscopic eyewear utilized by the viewer to implement the display condition requested by the viewer.

23 Claims, 18 Drawing Sheets

(51) Int. Cl.
*H04N 13/04* (2006.01)
*G02B 27/22* (2006.01)
*G03B 35/16* (2006.01)
*G02B 27/00* (2006.01)
*G09G 3/00* (2006.01)

(52) U.S. Cl.
CPC ........ *H04N13/0452* (2013.01); *G02B 27/0093* (2013.01); *G09G 3/003* (2013.01); *H04N 13/0438* (2013.01); *H04N 13/0497* (2013.01); *G02B 27/2264* (2013.01); *H04N 2213/008* (2013.01)
USPC .......................................... 348/55; 345/633

(56) References Cited

U.S. PATENT DOCUMENTS 8,421,848 B2 * 4/2013 Watabu et al. ................. 348/42
2006/0061652 A1 3/2006 Sato et al.
2008/0285801 A1 * 11/2008 Heinzmann et al. .......... 382/103
2010/0103196 A1 * 4/2010 Kumar et al. .................. 345/633
2010/0303252 A1 12/2010 Funakoshi
2011/0199463 A1 * 8/2011 Gallagher et al. .............. 348/53
2011/0216175 A1 9/2011 Shimoyama et al.
2012/0169730 A1 7/2012 Inoue

FOREIGN PATENT DOCUMENTS

| | | |
|---|---|---|
| JP | 2005-62389 A | 3/2005 |
| JP | 2006-84963 A | 3/2006 |
| JP | 2006-84964 A | 3/2006 |
| JP | 2006-196995 A | 7/2006 |
| JP | 2008-146221 A | 6/2008 |
| JP | 2010-278996 A | 12/2010 |
| JP | 2011-3992 A | 1/2011 |
| JP | 2011-71898 A | 4/2011 |
| JP | 2011-188118 A | 9/2011 |

* cited by examiner

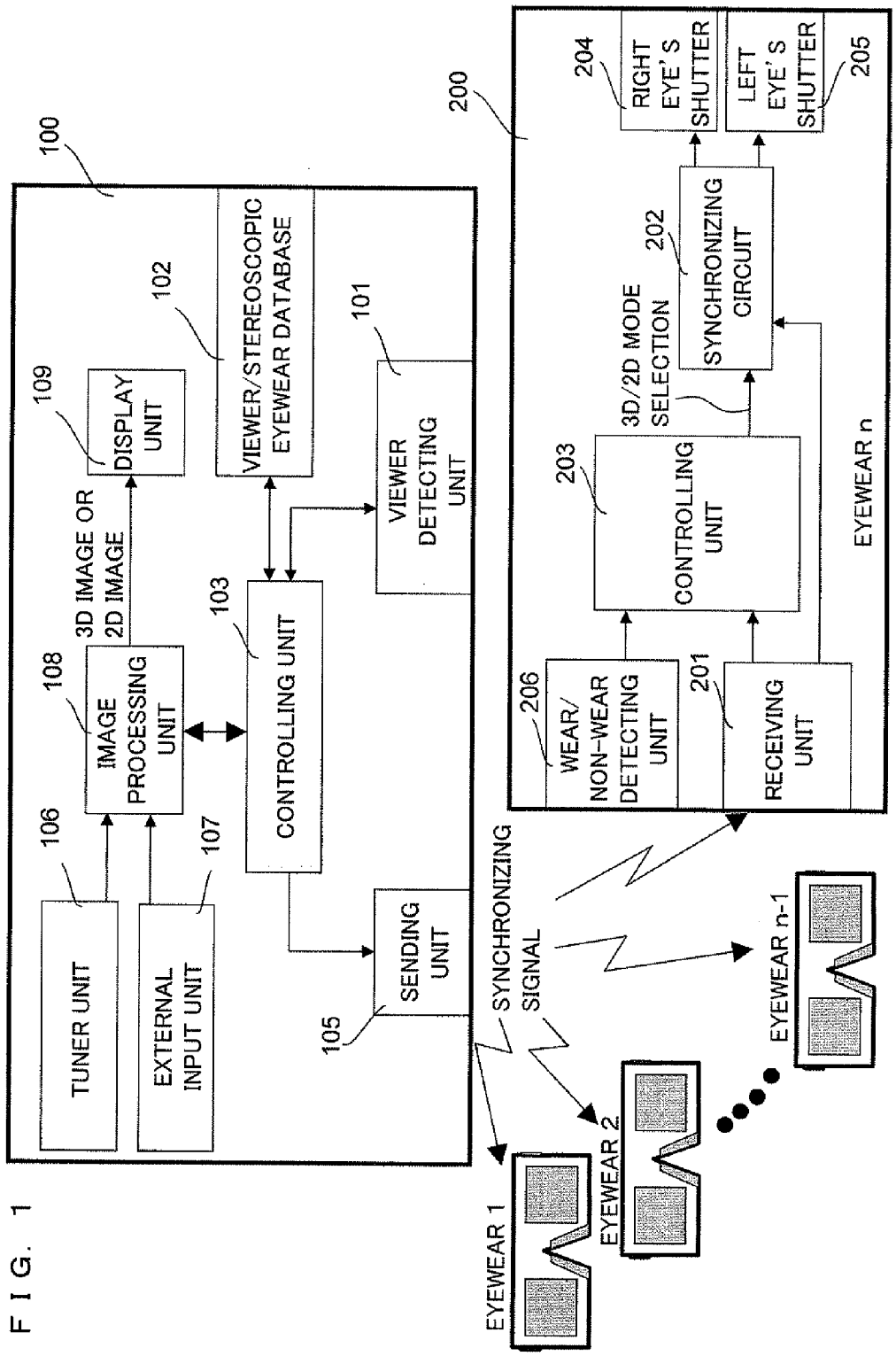

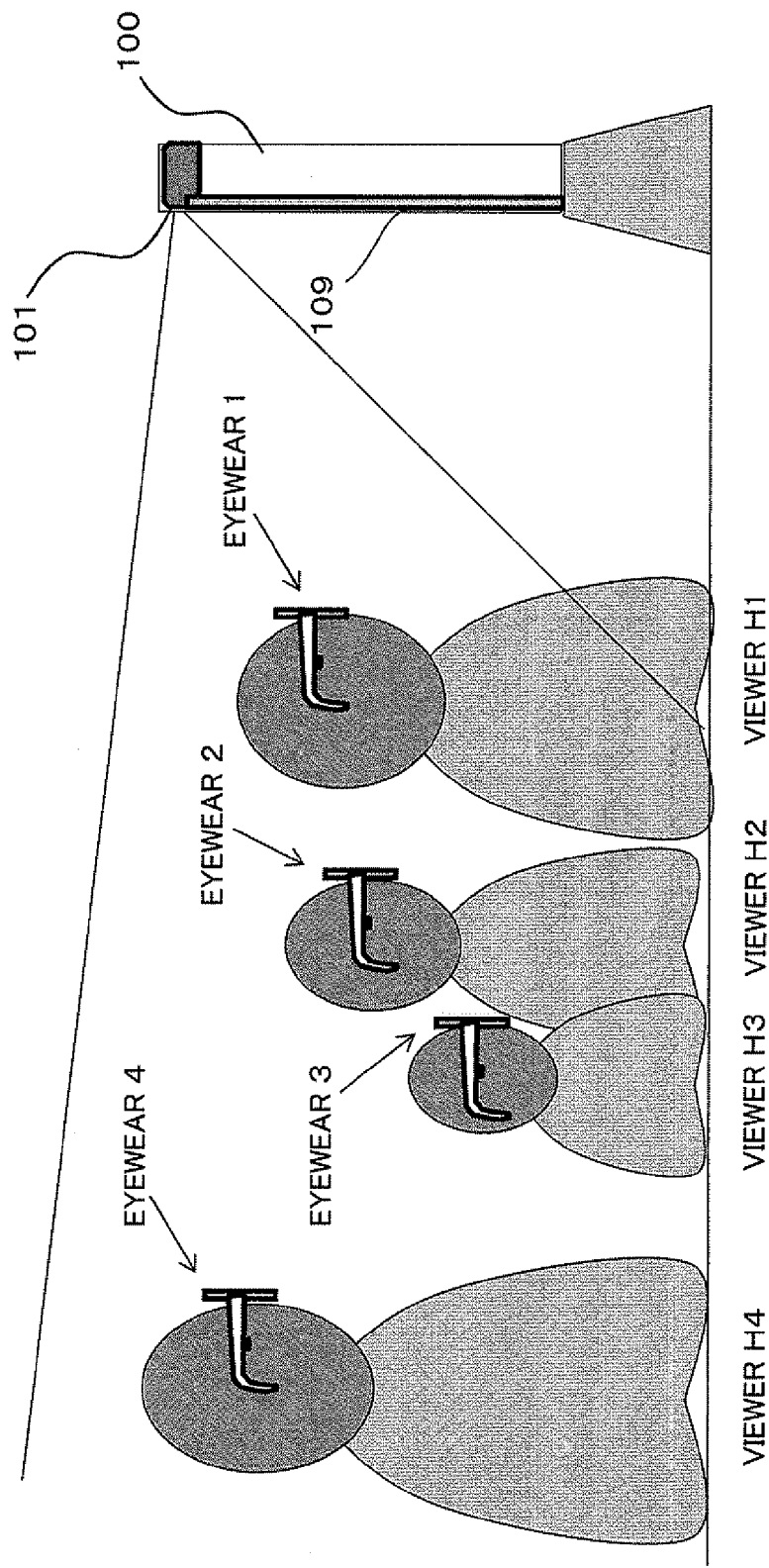

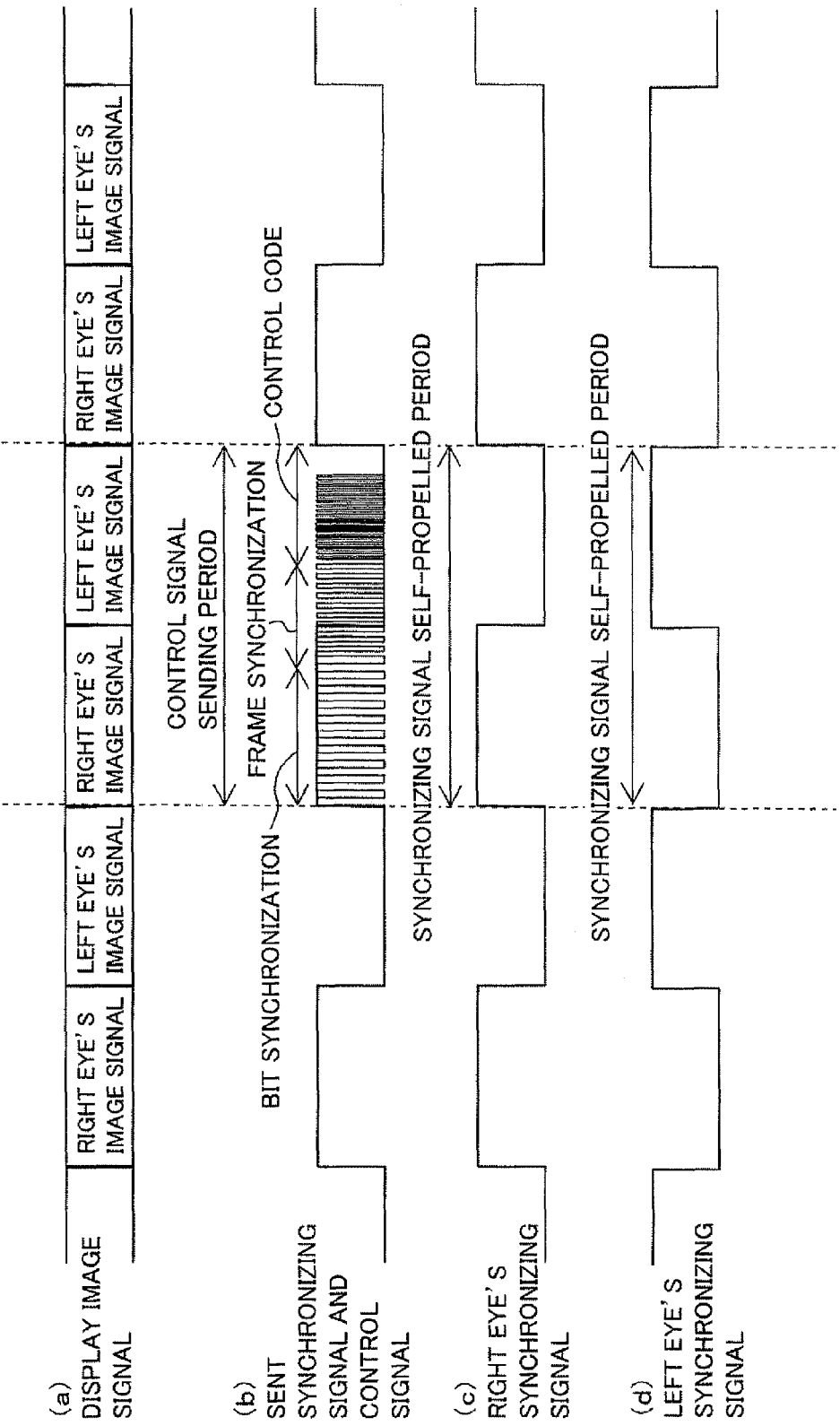

FIG. 6
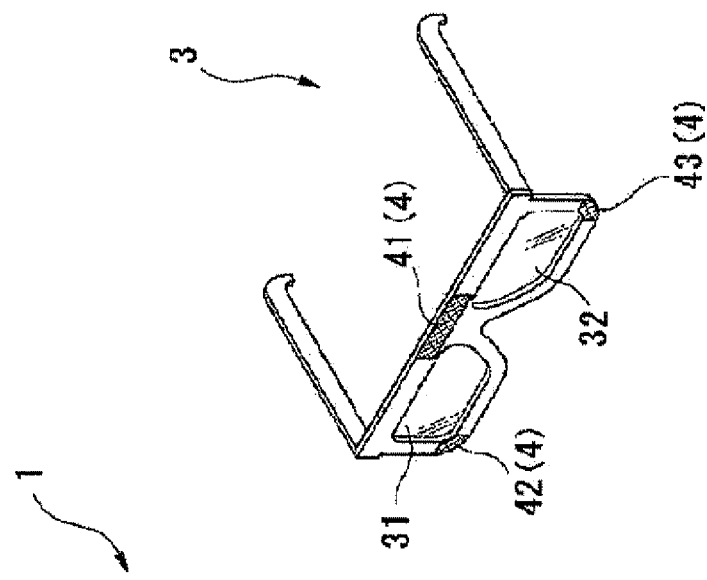
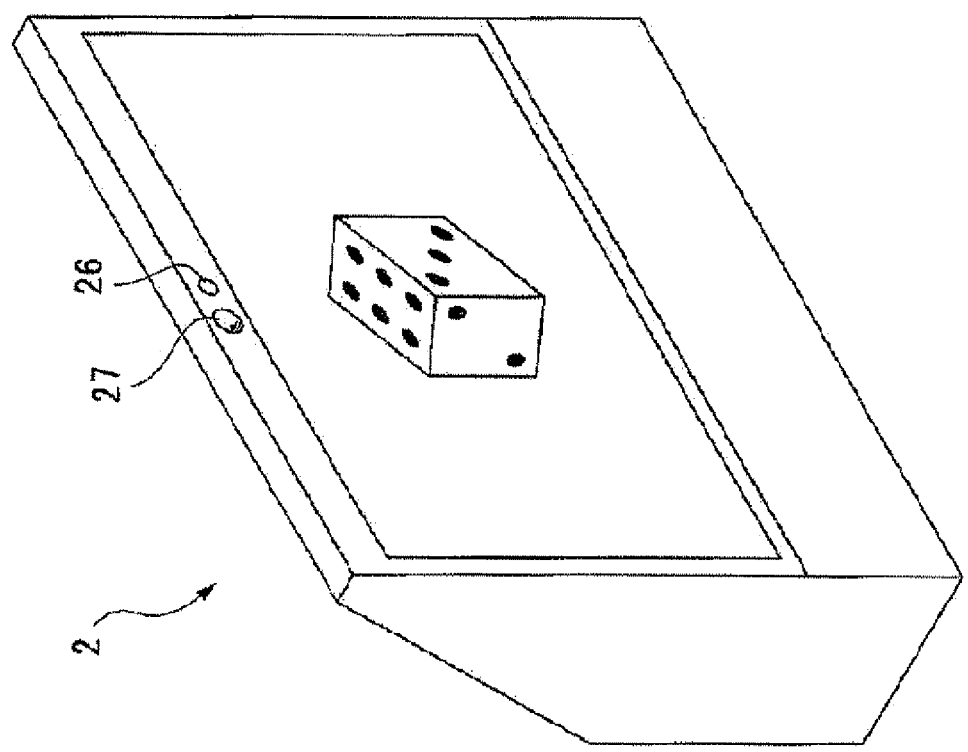

| REGISTRATION NUMBER K | VIEWER'S IMAGE | MODE | NAME | PRIORITY |
|---|---|---|---|---|
| 1 | — | 3D | TARO | 2 |
| 2 | — | 3D | ... | 3 |
| 3 | — | 3D | ... | 4 |
| 4 | — | 2D | ... | 1 |
| ⋮ | ⋮ | ⋮ | ⋮ | ⋮ |

F I G. 8

| REGISTRATION NUMBER G | EYEWEAR'S IMAGE | MARK POSITION | SERIAL NUMBER | PRIORITY |
|---|---|---|---|---|
| 1 | — | LOWER RIGHT | ABC | 1 |
| 2 | — | ... | ... | 2 |
| 3 | — | ... | ... | 3 |
| 4 | — | ... | ... | 4 |
| ⋮ | ⋮ | ⋮ | ⋮ | ⋮ |

2T

F I G. 1 5
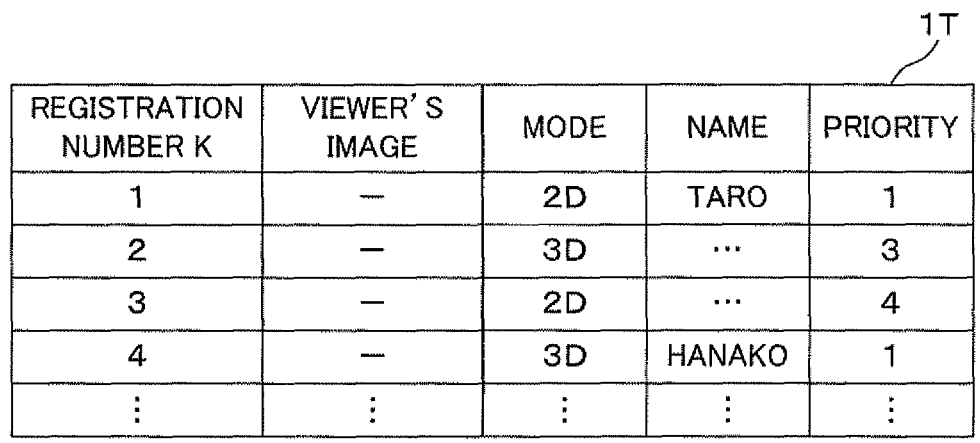

STEREOSCOPIC-IMAGE DISPLAY APPARATUS AND STEREOSCOPIC EYEWEAR

CROSS-REFERENCE TO RELATED APPLICATION

This application is the national phase under 35 U.S.C.§371 of PCT International Application No. PCT/JP2011/080450 which has an International filing date of Dec. 28, 2011 and designated the United States of America.

FIELD OF THE INVENTION

The present invention relates to a stereoscopic-image display apparatus and stereoscopic eyewear that change a stereoscopic (3D) image and a planar (2D) image based on the display condition requested by the plural viewers who view a stereoscopic (3D) image.

BACKGROUND OF THE INVENTION

Although having become increasingly popular, the 3D image is recently made on the basis of the binocular parallax technology. For example, a non-patent document 1 shows a technical explanation regarding the 3D image and a safety guideline regarding the 3D image. The human recognizes image signals generated from two view points, i.e., the right eye and left eye, and thus determines whether an object is stereoscopic or not. The distance of human's right eye and left eye is about 5-7 cm varied from a child to an adult. Therefore, the images accepted by right and left eyes are respectively different because of the viewer's view points. The difference becomes larger when the distance to the object is closer, and becomes smaller when the distance to the object is farther. The brain perceives on the basis of the parallax caused by the both eyes whether the object is stereoscopic or not.

As respectively giving images made from different view points to the right eye and left eye, the viewer can feel the depth of image. The 3D display utilizing the binocular parallax is a technology, which utilizes a 3D eyewear, such as a liquid crystal shutter, and independently and repeatedly gives images to the right and left eyes. For example, when the right eye's image and left eye's image are sequentially arranged on a display based on that principle, the image shown on the display looks like stereoscopic and the human can perceive the stereoscopic image protruding back and forth with respect to the display surface. When the degree of parallax is increased, the back and/or forth protruding amounts become larger. Thus, using the 3D eyewear, such as a liquid crystal shutter, can enhance the impression and surprise to the viewer who is viewing the image.

Some eyewear is commercially available as the 3D eyewear dedicated for the 3D TV, which includes a changing switch for changing from the 3D image to the 2D image. When a viewer wearing the 3D eyewear views the 3D image and have tired eyes, the viewer can double-click the changing switch for forcibly changing the 3D image into the 2D image. When the changing switch is clicked to select the change into the 2D image with the eyewear having the liquid crystal shutter that is utilized for the 3D TV and alternately shows the right eye's image and left eye's image, respective liquid crystal shutters for the left and right eyes open the shutters at the same timing for showing the right eye's image or left eye's image. Thus, the same image can be given to the viewer's both eyes, i.e., the right eye's image or left eye's image.

A patent document 1 shows a stereoscopic-image display apparatus that includes a reflecting member on a frame of a 3D eyewear, and a display device having a means for emitting light and a light receiving means for receiving reflected light, and that receives light reflected from the 3D eyewear to determine whether the 3D eyewear is worn or not and then to change the display from the 3D image to the 2D image. FIG. 6 is a perspective view that shows a schematic configuration of the stereoscopic-image display apparatus in the patent document 1. In this stereoscopic-image display apparatus, the right eye's image and left eye's image are alternately displayed, similarly to the 3D TV described above. The stereoscopic-image display apparatus emits light for detecting the wearing condition, and checks whether or not light reflected from the reflecting member arranged on the frame of the 3D eyewear is received. When having received the reflected light, the stereoscopic-image display apparatus determines that the viewer is wearing the 3D eyewear and continues displaying the 3D image. The viewer wearing the 3D eyewear can view the 3D image. When having not received the reflected light, the stereoscopic-image display apparatus determines that the viewer is not wearing the 3D eyewear. Then, the stereoscopic-image display apparatus generates any one of the right eye's and left eye's images described above, and automatically changes into the 2D image without the viewer's manipulation.

PRIOR ART

Non-patent document

Non Patent Document 1: "3DC Safety Guideline", [online], 20 Apr. 2010, 3D consortium safety guideline committee, [search date: 8 Jun. 2010], Internet [URL:http://www.3dc.gr.jp/jp/scmt_wg_rep/3dc_guideJ_20100420.pdf].

Patent Document

Patent Document 1: Japanese Patent Application Laid-Open No. 2006-84964

SUMMARY OF THE INVENTION

Problems to be Solved by the Invention

However, it is known by experts that 4%-10% of the human cannot recognize that the 3D image made with the method described above is the 3D image. Because of any reason (strabismus, amblyopia, astigmatism or the like), they cannot control both eyes to focus in the same space. They perceive that the 3D image made with the method described above is the degraded 2D image. Thus, they will be discomforted and/or have a headache. When they want to enjoy 3D TV program with other people and to view the TV program as the 2D image, they have to do the manipulation of changing into the 2D image with wearing the eyewear each time. It will annoy the viewers.

In addition, viewing continuously the 3D image made with the method described above during a long period of time can cause the eye strain and viewers will be discomforted and/or have headaches. When plural persons simultaneously view the same TV program and all of them want any one of the 3D and 2D images, the stereoscopic-image display apparatus shown in the patent document 1 may be enough. However, when plural persons want different images from each other, the stereoscopic-image display apparatus shown in the patent document 1 is not enough.

Thus, the present invention is made in order to solve the problem described above, and has an object to implement the display condition requested by the viewer with automatically determining and displaying the 3D image or 2D image based on the viewer who wear the 3D eyewear, without requiring the viewer to perform the changing manipulation.

Means for Solving the Problems

A stereoscopic-image display apparatus according to the present invention can display about stereoscopic image signals on a display unit, and comprises an image processing unit that outputs a 3D image or a 2D image to the display unit, a viewer detecting unit that detects a viewer who views the stereoscopic image, a viewer registering means for registering an individual data detected by the viewer detecting unit, a eyewear registering means for registering an individual data of a stereoscopic eyewear utilized for viewing the stereoscopic image, a viewer/stereoscopic eyewear database that manages the individual data of the viewer and the individual data of the stereoscopic eyewear, and a sending unit that sends a synchronizing signal, based on a verification result of the viewer/stereoscopic eyewear database, which is utilized for viewing a stereoscopic image signal as a stereoscopic image.

The stereoscopic-image display apparatus according to the present invention comprises the viewer detecting unit that detects a viewer facing to the display unit and the stereoscopic eyewear worn by the viewer in accordance with the viewer/stereoscopic eyewear database, and superimposes a control signal instructing a 3D mode or a 2D mode to the stereoscopic eyewear worn by the viewer onto the synchronizing signal in order to implement a display condition required by the viewer, in accordance with a relationship information of the viewer stored in the viewer/stereoscopic eyewear database.

The stereoscopic-image display apparatus according the present invention comprises the image processing unit that outputs any one of a right eye's image and a left eye's image as the 3D image, when the viewer detecting unit determines that none of the viewers detected by the viewer detecting unit wear the stereoscopic eyewear.

The stereoscopic-image display apparatus according to the present invention comprises the image processing unit that outputs any one of a right eye's image and a left eye's image as the 3D image, when the viewer detecting unit determines that all of the viewers detected by the viewer detecting unit require a 2D display.

A stereoscopic-image display apparatus according to the present invention displays a stereoscopic image or planar image regarding an image signal on a display unit, and comprises an image processing unit that outputs an image signal regarding a stereoscopic image or planar image to the display unit, a detecting unit that detects a viewer who views an image displayed on the display unit and that detects a stereoscopic eyewear for viewing a stereoscopic image displayed on the display unit, a database that registers attribute information of the viewer and the stereoscopic eyewear, a viewer registering means for registering the viewer detected by the detecting unit into the database, an eyewear registering means for registering the stereoscopic eyewear detected by the detecting unit into the database, and a verifying means for verifying the attribute information registered in the database, based on the viewer or the stereoscopic eyewear detected by the detecting unit, wherein the viewer registering means is configured to associate and register a priority among the viewers detected by the detecting unit into the database, the stereoscopic-image display apparatus comprises a determining means for determining in accordance with a verification result of the verifying means whether or not a viewer having the highest priority of the viewers detected by the detecting unit wears the stereoscopic eyewear, the image processing unit is configured to output an image signal regarding a right eye's image or left eye's image of a stereoscopic image when the determining means determines that the viewer having the highest priority of the viewers detected by the detecting unit does not wear the stereoscopic eyewear, and the display unit is configured to display an image regarding the image signal output by the image processing unit.

A stereoscopic-image display apparatus according to the present invention displays a stereoscopic image or planar image regarding an image signal on a display unit, and comprises an image processing unit that outputs an image signal regarding a stereoscopic image or planar image on the display unit, a detecting unit that detects a viewer who views an image displayed on the display unit and that detects a stereoscopic eyewear for viewing a stereoscopic image displayed on the display unit, a database that registers attribute information of the viewer and stereoscopic eyewear, a viewer registering means for registering the viewer detected by the detecting unit into the database, an eyewear registering means for registering the stereoscopic eyewear detected by the detecting unit, a verifying means for verifying attribute information registered in the database, based on the viewer or stereoscopic eyewear detected by the detecting unit, and a sending unit that sends a synchronizing signal corresponding to the stereoscopic image displayed by the display unit, based on a result verified by the verifying means, wherein the viewer registering means is configured to register viewers detected by the detecting unit, a priority among the viewers, and a selection of displaying a planar image or a stereoscopic image, in association with each other, into the database, the stereoscopic-image display apparatus comprises a determining means for determining in accordance with a result verified by the verifying means whether or not a viewer having the highest priority of the viewers detected by the detecting unit wears the stereoscopic eyewear, the image processing unit is configured to output an image signal regarding a right eye's image or left eye's image of a stereoscopic image to the display unit when the determining means determines that the viewer having the highest priority of the viewers detected by the detecting unit does not wear the stereoscopic eyewear, the display unit is configured to display an image regarding the image signal output by the image processing unit, and the sending unit is configured to send the synchronizing signal to the stereoscopic eyewear, on which a control signal about the selection of displaying the planar image or stereoscopic image registered in the database is superimposed.

A stereoscopic-image display apparatus according to the present invention displays a stereoscopic image or planar image regarding an image signal on a display unit, and comprises an image processing unit that outputs an image signal regarding a stereoscopic image or planar image on the display unit, a detecting unit that detects a viewer who views an image displayed on the display unit, and that detects a stereoscopic eyewear utilized for viewing a stereoscopic image displayed on the display unit, a database that registers attribute information of the viewer and the stereoscopic eyewear, a viewer registering means for registering the viewer detected by the detecting unit in the database, an eyewear registering means for registering the stereoscopic eyewear detected by the detecting unit in the database, and a verifying means for verifying attribute information registered in the database, in accordance with the viewer or stereoscopic eyewear detected by the detecting unit, wherein the viewer registering means is configured to register viewers detected by the detecting unit, a priority among the viewers, and a selection of displaying a planar image or stereoscopic image, in association with each other, into the database, the image processing unit is configured to output an image signal regarding a right eye's image or left eye's image of the stereoscopic image to the display unit in accordance with a result verified by the verifying means when a viewer having the highest priority of the viewers detected by the detecting unit is associated with the selection of displaying the planar image, and the display unit is configured to display an image regarding the image signal output by the image processing unit.

A stereoscopic-image display apparatus according to the present invention displays a stereoscopic image or planar image regarding an image signal on a display unit, and comprises an image processing unit that outputs an image signal regarding a stereoscopic image or planar image to the display unit, a detecting unit that detects a viewer who views an image displayed on the display unit, and that detects a stereoscopic eyewear utilized for viewing a stereoscopic image displayed on the display unit, a database that registers attribute information of the viewer and the stereoscopic eyewear, a viewer registering means for registering the viewer detected by the detecting unit in the database, an eyewear registering means for registering the stereoscopic eyewear detected by the detecting unit in the database, and a verifying means for verifying attribute information registered in the database, in accordance with the viewer or stereoscopic eyewear detected by the detecting unit, wherein the viewer registering means is configured to register the viewer detected by the detecting unit and a selection of displaying a planar image or stereoscopic image in association with each other into the database, the eyewear registering means is configured to register stereoscopic eyewears detected by the detecting unit and a priority among the stereoscopic eyewears in association with each other into the database, the image processing unit is configured to output an image signal regarding a right eye's image or left eye's image of a stereoscopic image in accordance with a result verified by the verifying means, when a viewer who wears a stereoscopic eyewear having the highest priority of the stereoscopic eyewear's detected by the detecting unit is associated with the selection of displaying the planar image, and the display unit is configured to display an image regarding the image signal output by the image processing unit.

A stereoscopic-image display apparatus according to the present invention displays a stereoscopic image or planar image regarding an image signal on a display unit, and comprises an image processing unit that outputs an image signal regarding a stereoscopic image or planar image to the display unit, a detecting unit that detects a viewer who views an image displayed on the display unit, and that detects a stereoscopic eyewear utilized for viewing a stereoscopic image displayed on the display unit, a database that registers attribute information of the viewer and the stereoscopic eyewear, a viewer registering means for registering the viewer detected by the detecting unit in the database, an eyewear registering means for registering the stereoscopic eyewear detected by the detecting unit in the database, a verifying means for verifying attribute information registered in the database, in accordance with the viewer or stereoscopic eyewear detected by the detecting unit, and a sending unit that sends a synchronizing signal corresponding to a stereoscopic image displayed by the display unit to the stereoscopic eyewear, in accordance with a result verified by the verifying means, the viewer registering means is configured to register viewers detected by the detecting unit, a priority among the viewers, and a selection of displaying a planar image or stereoscopic image in association with each other into the database, the eyewear registering means is configured to register stereoscopic eyewear's detected by the detecting unit and a priority among the stereoscopic eyewear's in association with each other into the database, the image processing unit is configured to output an image signal regarding a right eye's image or left eye's image of a stereoscopic image to the display unit in accordance with a result verified by the verifying means, when plural viewers have the highest priority of the viewers detected by the detecting unit and a viewer who wears a stereoscopic eyewear having the highest priority among the plural viewers is associated with the selection of displaying the planar image, the display unit is configured to display an image regarding the image signal output by the image processing unit, and the sending unit is configured to send the synchronizing signal to the stereoscopic eyewear, in which a control signal corresponding to the selection of displaying the planar image or stereoscopic image registered in the database is superimposed.

A stereoscopic eyewear according to the present invention is utilized for viewing a 3D image with a binocular parallax technology, and comprises a receiving unit that can receive and separate a synchronizing signal sent in a synchronous manner with display timings of a right eye's image and a left eye's image, and a sent control signal superimposed onto the synchronizing signal, and a synchronizing circuit that controls opening and closing of a right eye's shutter and left eye's shutter based on the synchronizing signal received by the receiving unit.

The stereoscopic eyewear according to the present invention includes the synchronizing circuit which comprises a changing means that changes an open/close timing for the left eye's shutter and right eye's shutter to be any one of display timings for the right eye's image or left eye's image when the control signal received by the receiving unit instructs to display a 2D image.

The stereoscopic eyewear according to the present invention includes the synchronizing circuit that is self-propelled in synchronization with the synchronizing signal, which is before the control signal is received, during a period in which the receiving unit is receiving the control signal.

The stereoscopic eyewear according to the present invention comprises an individual selection mark portion that makes the stereoscopic eyewear become distinguishable from another stereoscopic eyewear with images captured from a front surface of these stereoscopic eyewear.

The stereoscopic eyewear according to the present invention comprises the individual selection mark portion that is arranged on the front surface of the stereoscopic eyewear.

The stereoscopic eyewear according to the present invention includes the individual selection mark portion that is arranged on a side surface portion of a frame included in the stereoscopic eyewear to make the stereoscopic eyewear become distinguishable with a shape of the frame.

The stereoscopic eyewear according to the present invention comprises a wear/non-wear detecting unit that is utilized for detecting whether the stereoscopic eyewear is worn or not, wherein powers for all of elements included in the stereoscopic eyewear other than the wear/non-wear detecting unit are turned off, when it is detected that the stereoscopic eyewear is not worn.

The stereoscopic eyewear according to the present invention comprises the wear/non-wear detecting unit that is arranged on a nosepiece.

The stereoscopic eyewear according to the present invention comprises the wear/non-wear detecting unit that is arranged on a portion positioning inside the frame and in contact with viewer's skin.

The stereoscopic eyewear according to the present invention comprises the wear/non-wear detecting unit that is arranged on a portion of the frame included in the stereoscopic eyewear resting on a viewer's ear.

Advantageous Effect of the Invention

With the stereoscopic-image display apparatus and stereoscopic eyewear according to the present invention, it is possible automatically decide and provide the 3D image or 2D image based on the viewer wearing the 3D eyewear. Therefore, it is possible to implement the display condition required by the viewer, without requesting the viewer to perform the changing manipulation.

The above and further objects and features of the invention will more fully be apparent from the following detailed description with accompanying drawings.

BRIEF DESCRIPTION OF THE DRAWINGS

FIG. 1 is a functional block diagram that shows a configuration of main parts included in a stereoscopic-image display apparatus and stereoscopic eyewear of an embodiment according to the present invention.

FIG. 2 is a perspective view that shows a schematic configuration of the stereoscopic-image display apparatus in the embodiment according to the present invention.

FIG. 4 is a view for explaining timings of sending a synchronizing signal and a control signal in the stereoscopic-image display apparatus of the embodiment according to the present invention.

FIG. 6 is a perspective view that shows a schematic configuration of a conventional stereoscopic-image display apparatus.

FIG. 8 is a view that shows an example of a record layout in a eyewear table.

FIG. 15 is a view showing another example of the record layout in the viewer table.

DESCRIPTION OF THE PREFERRED EMBODIMENTS

Figure 3A:
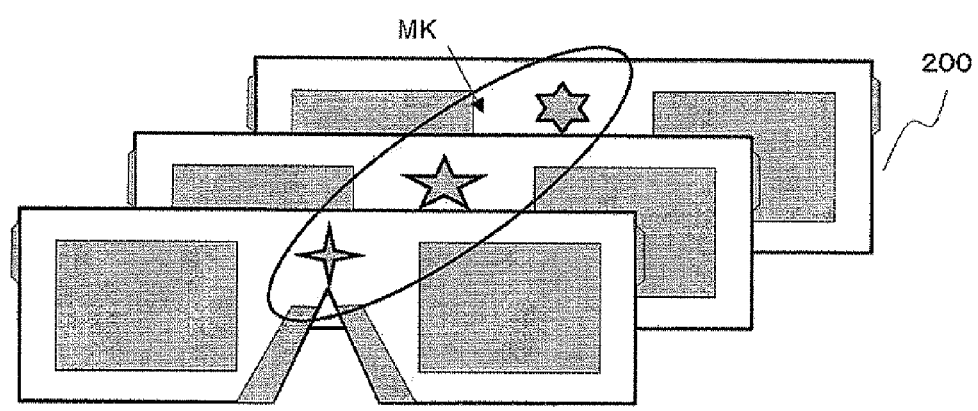
FIG. 3A is a view for explaining an individual selection mark portion of the eyewear regarding the stereoscopic-image display apparatus in the embodiment according to the present invention.

Embodiments of the present invention are described below with reference to figures.
Embodiments
Embodiment 1

FIG. 1 is a functional block diagram that shows a configuration of main parts included in a stereoscopic-image display apparatus 100 of an embodiment according to the present invention and is a functional block diagram that shows a stereoscopic eyewear 200 of an embodiment according to the present invention.

The stereoscopic-image display apparatus 100 is configured with a viewer detecting unit 101 that is utilized for identifying a viewer and a stereoscopic eyewear 200 worn by the viewer, a viewer/stereoscopic eyewear database 102 that stores and manages respective individual data of the viewer and stereoscopic eyewear 200, a controlling unit 103, a sending unit 105 that is utilized for sending to a stereoscopic eyewear 200 of a synchronizing signal synchronized with display timings of a right eye's image and left eye's image, a control signal utilized for changing a view mode of the stereoscopic eyewear 200 between the 3D mode and 2D mode, and the like, a tuner unit 106 that is utilized for receiving the broadcast wave, and an external input unit 107 that is utilized for connecting input signals obtained from the outside.

In addition, the stereoscopic eyewear 200 is configured with a receiving unit 201 that is utilized for receiving and separating the synchronizing signal and control signal sent from the stereoscopic-image display apparatus 100, a synchronizing circuit 202 that receives the synchronizing signal separated by the receiving unit 201, a controlling unit 203 that receives the control signal separated by the receiving unit 201, a right eye's shutter 204 that is utilized for viewing the right eye's image for the 3D image, a left eye's shutter 205 that is utilized for viewing the left eye's image for the 3D image, and a wear/non-wear detecting unit 206 that detects whether the viewer wear the eyewear or not. An eyewear 1, and eyewear 2 to eyewear n−1 are stereoscopic eyewears configured similarly to the stereoscopic eyewear 200.

The image processing unit 108 detects whether a broadcast program received by the tuner unit 106 of the stereoscopic-image display apparatus 100 contains the 3D image or 2D image. Then the image processing is performed on the received broadcast program, and the received broadcast program is displayed as the 3D image or 2D image on the display unit 109 based on the sending timing from the controlling unit 103. When the received broadcast program contains the 2D image, the sending unit 105 does not need sending the synchronizing signal to the stereoscopic eyewear 200 and thus the controlling unit 103 instructs the sending unit 105 to stop sending the synchronizing signal or to keep the stop condition. When the received broadcast program contains the 3D image, the controlling unit 103 instructs the sending unit 105 to start sending the synchronizing signal or to keep the sending condition.

Similarly, it is described about the case that the image displayed on the display unit 109 is a source image based on the external input unit 107. When the image displayed on the display unit 109 is not the broadcast program obtained from the tuner unit 106 but a source image obtained from other filming equipment, such as a BD/DVD player and CATV tuner, the image processing unit 108 detects whether the source image contains the 3D image or only the 2D image. When the source image contains the 3D image, the image processing is performed on the source image. Then, the source image is displayed as the 3D image on the display unit 109 based on the sending timing from the controlling unit 103. Similarly, the instruction to start sending the synchronizing signal or to keep the sending condition is given to the sending unit 105. When the source image contains only the 2D image, only the source image input into the external input unit 107 is displayed. Then, the instruction to stop sending the synchronizing signal or to keep the stop condition is given to the sending unit 105, when the synchronizing signal is being sent.

Furthermore, the stereoscopic-image display apparatus 100 includes the viewer detecting unit 101 for detecting a viewer who views the 3D image or 2D image displayed on the display unit 109. The viewer detecting unit 101 detects the stereoscopic eyewear 200 worn by the viewer, too. The viewer detecting unit 101 is configured with a camera for capturing the viewer and stereoscopic eyewear 200 as image data, with an image coding circuit for coding the captured image data into specific compressed images, with a memory for performing the coding processing, and the like. The stereoscopic-image display apparatus 100 utilizes the viewer detecting unit 101 to capture the image data of a viewer who has never utilized before, and stores image data utilized for individually determining the viewer into the viewer/stereoscopic eyewear database 102.

Although not shown, the stereoscopic-image display apparatus 100 includes a viewer registering means and eyewear registering means for registering the viewers utilizing the present apparatus and stereoscopic eyewear 200 being utilized with the present apparatus. For example, a registration button may be provided on a remote controller or the like, for registering the viewers and stereoscopic eyewear 200. When the registration button is pushed, the display unit 109 displays the selection screen showing a "registration of viewer", "registration of stereoscopic eyewear", "registration of both viewer and stereoscopic eyewear" or "return". The viewer comes in front of the viewer detecting unit 101 included in the stereoscopic-image display apparatus 100 with wearing the stereoscopic eyewear 200, and utilizes the remote controller to select any of the registration items after pushing the registration button. When the "return" button is pushed, processing regarding the registration is aborted and the initial condition is returned. When the buttons other than the "return" button are pushed, the camera of the viewer detecting unit 101 zooms up the object, such as the viewer and stereoscopic eyewear 200 and captures the image data having an appropriate size for the registration.

When the "registration of viewer" has been selected at that time, the viewer detecting unit 101 detects a person in the image captured by the camera, performs zooming to make the entire of the detected person be shown, and capture the image. Alternatively, it may be configured to extract a face portion and capture it. It may be configured to capture the upper body portion. In addition, it may be configured to capture an image whose size is selected by the viewer.

When the "registration of stereoscopic eyewear" has been selected at that time, the viewer detecting unit 101 detects the viewer's face shown in the image captured by the camera, zooms up the portion of the stereoscopic eyewear 200 worn by the viewer, and captures the image data of the stereoscopic eyewear 200 having an appropriate size for the registration.

When the "registration of both viewer and stereoscopic eyewear" has been selected at that time, the viewer detecting unit 101 sequentially performs the operation performed in the case that the "registration of viewer" is selected and the operation performed in the case that the "registration of stereoscopic eyewear" is selected. Since there is no priority, any one of the operations can be performed initially.

The captured image data is provisionally stored as an image file compressed by a predetermined image compression coding in the memory utilized for the coding processing. The image data stored in the memory utilized for the coding processing is displayed on the display unit 109, to ask the viewer whether or not the viewer allows registering the image data in the viewer/stereoscopic eyewear database 102. When the viewer allows of registration, the controlling unit 103 stores the image data displayed on the display unit 109 as the image data utilized for the "registration of viewer" or for the "registration of stereoscopic eyewear" in a predetermined region of the viewer/stereoscopic eyewear database 102. The image compression coding method utilized for the registration image data may be the JPEG, TIFF, GIF, PDF or the like.

Although the registration method utilized for registering the viewer and stereoscopic eyewear 200 in a condition of the stereoscopic eyewear 200 being worn is described above, it may be configured that the viewer and stereoscopic eyewear 200 are separately registered, and that the search data is generated by combining the image data of the viewer not wearing the stereoscopic eyewear 200 and the image data of the stereoscopic eyewear 200 when the data search is performed about the viewer who views the stereoscopic-image display apparatus 100.

In addition, it may be configured that a menu type interface is prepared for allowing the viewer to input other individual data regarding the viewer and stereoscopic eyewear 200, while the viewer registering means and eyewear registering means are utilized for registering the image data of the viewer and stereoscopic eyewear 200. For example, it is possible as the viewer's individual data to utilize several items other than viewer's image data, such as a registration number K, mode selection, name, age, height, sex, nickname, and favorite category. It is possible as the individual data regarding stereoscopic eyewear 200 to utilize several items other than image data of the stereoscopic eyewear 200, such as a registration number G, mark position, serial number, manufacture's name, model name, model number, color, and year's type. It may be configured about the individual data of the stereoscopic eyewear 200 that the viewer can open the menu or the like and input something only for the required item. Furthermore, it may be configured that the eyewear is partially provided with a seal on which a two-dimensional barcode storing individual data is applied, or a two-dimensional barcode printed on a warranty card or instruction manual is captured by the camera of the viewer detecting unit 101 and analyzed, in order to store in the viewer/stereoscopic eyewear database 102 as the individual data of the stereoscopic eyewear 200.

An example is explained above in which the registration buttons are provided on the remote controller. However, it may be configured that the display unit 109 displays a menu for registering the viewer and stereoscopic eyewear in response to the push of option button provided on the remote controller, in order to select each item and individually input the data.

FIG. 2 is a perspective view that shows a schematic configuration of the stereoscopic-image display apparatus 100 in the embodiment according to the present invention. The viewer H1 to viewer H3 are persons who want to view the displayed 3D image as the 3D image, when viewing the 3D image with the stereoscopic-image display apparatus 100. The viewer H4 is a person who wants only the 2D image for the displayed image, because the person cannot recognize the displayed 3D image as the 3D image. Among those persons, the viewer H1, viewer H2 and viewer H4 are adults, and the viewer H3 is a child.

Next, it will be described in detail about the operation of the viewer detecting unit 101. When the display unit 109 displays the 3D image, the viewer detecting unit 101 regularly captures viewer's image and extracts a captured person. In addition, when the source image obtained from the tuner unit 106 or external input unit 107 is the 3D image even in the case that the display unit 109 displays the 2D image, the viewer detecting unit 101 regularly captures viewer's image and extracts a captured person. When the source image obtained from the tuner unit 106 or external input unit 107 is the 2D image, the viewer detecting unit 101 neither captures viewers nor extracts persons because the stereoscopic eyewear 200 is not required.

The viewer detecting unit 101 detects whether or not the person extracted from the image obtained by capturing the viewer wears the registered stereoscopic eyewear 200. When the detection result for the stereoscopic eyewear 200 represents that no viewer wear the stereoscopic eyewear 200, the viewer detecting unit 101 notifies to the controlling unit 103 that no viewer utilize the stereoscopic eyewear 200. After receiving the notification from the viewer detecting unit 101, the controlling unit 103 instructs the image processing unit 108 to display the 2D image. Based on the instruction from the controlling unit 103, the image processing unit 108 makes the display unit 109 display any one of the right eye's image and left eye's image regarding the 3D image.

When there is a viewer wearing the stereoscopic eyewear 200, the viewer detecting unit 101 notifies to the controlling unit 103 about the presence of the viewer utilizing the stereoscopic eyewear 200 and instructs the controlling unit 103 to take out the image data for verifying the viewer and stereoscopic eyewear 200 from the viewer/stereoscopic eyewear database 102. After receiving the instruction from the viewer detecting unit 101, the controlling unit 103 instructs the image processing unit 108 to display the 3D image. Based on the instruction from the controlling unit 103, the image processing unit 108 makes the display unit 109 alternately display the right eye's image or left eye's image regarding the 3D image.

Then, the controlling unit 103 sequentially takes out the image data of the viewer, and the image data utilized for verifying the viewer and stereoscopic eyewear 200 registered in the viewer/stereoscopic eyewear database 102 in orders of registration number K and registration number G.

At first, the verification image data for the stereoscopic eyewear 200 is taken out in order of the registration number G, and sent to the viewer detecting unit 101. The viewer detecting unit 101 compares the verification image data of the stereoscopic eyewear 200 sent from the controlling unit 103 and the image data of the stereoscopic eyewear 200 captured by the camera of the viewer detecting unit 101, and identifies what the stereoscopic eyewear 200 is with the registration number G.

The stereoscopic eyewear 200 is previously provided with the mark portion for the individual selection, in order to perform the individual determination. As shown in FIG. 2, the camera of the viewer detecting unit 101 is arranged at an upper portion of the stereoscopic-image display apparatus 100 in order to capture the viewer H1 to viewer H4 viewing the display unit 109 from the front surface. It is possible to simultaneously capture the eyewear 1 to eyewear 4 worn by the viewer H1 to viewer H4, respectively, from the front surface.

Figure 3B:
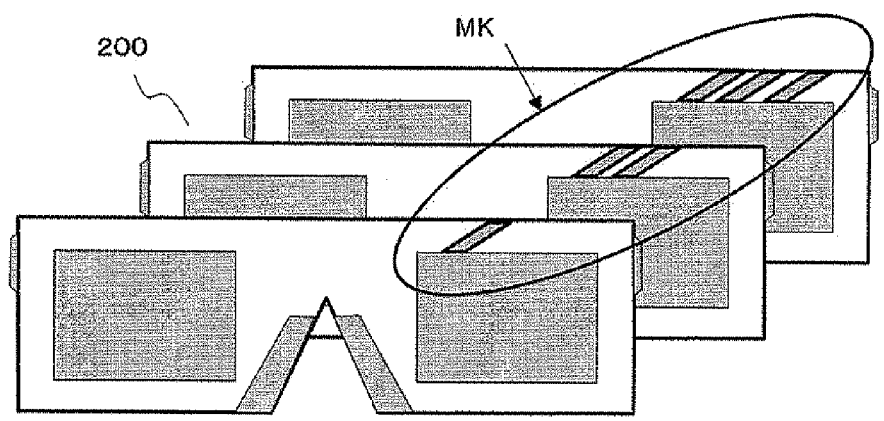
FIG. 3B is a view for explaining an individual selection mark portion of the eyewear regarding the stereoscopic-image display apparatus in the embodiment according to the present invention.
Figure 3C:
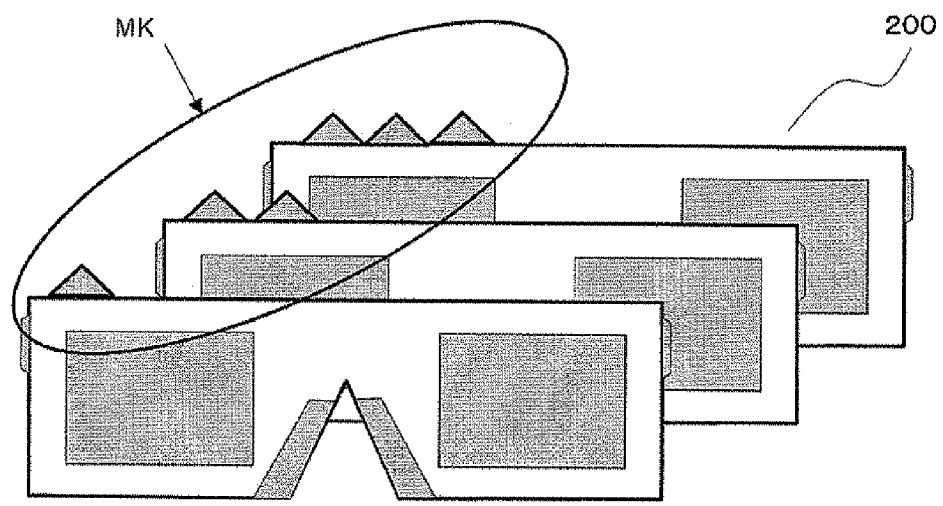
FIG. 3C is a view for explaining an individual selection mark portion of the eyewear regarding the stereoscopic-image display apparatus in the embodiment according to the present invention.
Figure 3D:
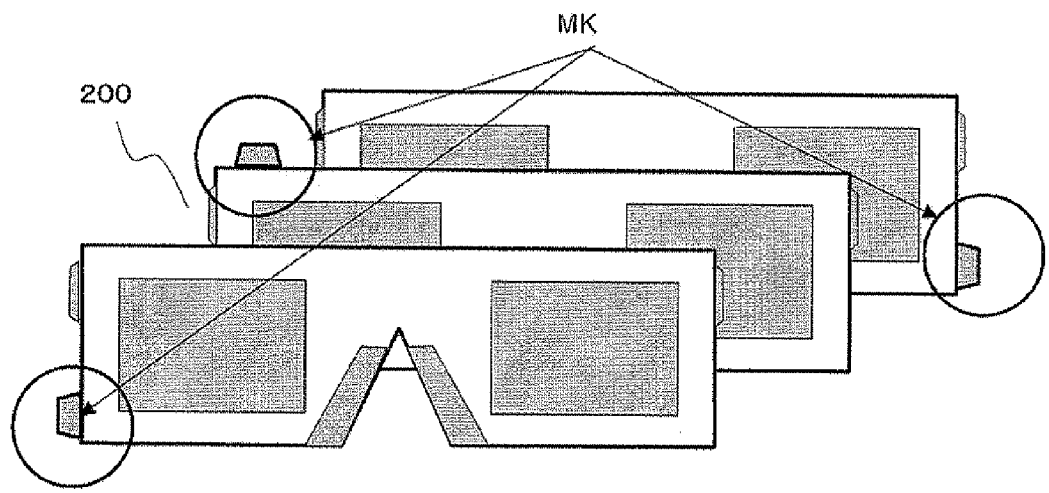
FIG. 3D is a view for explaining an individual selection mark portion of the eyewear regarding the stereoscopic-image display apparatus in the embodiment according to the present invention.

FIGS. 3A to 3D are views for explaining an individual selection mark portion MK of the eyewear regarding the stereoscopic-image display apparatus 100 in the embodiment according to the present invention. FIG. 3A shows an example in which the individual selection mark portion MK is applied on the center portion of the eyewear's lens. FIG. 3B shows an example in which the individual selection mark portion MK is applied on the peripheral portion of the eyewear. FIG. 3C shows an example in which a triangle mark is applied as the individual selection mark portion MK on the side surface of the eyewear's frame, to distiguish each eyewear based on the frame shape when the frame portion of eyewear is seen from the front surface. FIG. 3D shows an example in which a rectangular mark is applied as the individual selection mark portion MK on the side surface of the eyewear's frame, to distinguish each eyewear based on the frame shape when the frame portion of eyewear is seen from the front surface.

When the comparison result represents that the verified eyewear is one of the registered stereoscopic eyewears 200, the viewer detecting unit 101 stores the registration number G of the stereoscopic eyewear 200 in a working memory.

Next, the image data for verifying the viewer is taken out in order of the registration number K, and sent to the viewer detecting unit 101. The viewer detecting unit 101 compares the viewers' verification image data sent from the controlling unit 103 with the viewers' image data captured by the camera of the viewer detecting unit 101, and identify who is the viewer having the registration number K.

When there are plural viewers, the above processing for identifying the stereoscopic eyewear 200 and viewer is repeated and the combination of the registration number K of viewer accepted from the view detecting unit 101 and registration number G of stereoscopic eyewear 200 are stored into the working memory. When the processing for identifying all viewers is completed, the viewer detecting unit 101 gives the information about the combination of the registration number K of viewer and registration number G of stereoscopic eyewear 200 to the controlling unit 103. Based on the given information about the combination of the registration number K of viewer and registration number G of stereoscopic eyewear 200, the controlling unit 103 invokes individual data regarding the mode selection corresponding to the registration number K of the viewer identified by the viewer/stereoscopic eyewear database 102, determines whether the set mode selection represents to select the 3D mode or 2D mode, and makes the sending unit 105 send the control signal to the corresponding stereoscopic eyewear 200. The control signal is superimposed on the synchronizing signal and then sent to the corresponding stereoscopic eyewear 200.

FIG. 4 is a view for explaining the timings of sending the synchronizing signal and control signal in the stereoscopic-image display apparatus 100 of the embodiment according to the present invention.

FIG. 4(a) shows the display timing for the display image signal of the 3D image displayed on the display unit 109. The display unit 109 alternately displays the right eye's image signal and left eye's image signal. FIG. 4(b) shows the synchronizing signal synchronized with the display image signal. The synchronizing signal becomes H when the right eye's signal is displayed on the display unit 109, and becomes L when the left eye's signal is displayed on the display unit 109. The control signal is sent after superimposed on the synchronizing signal described above. In the example shown in the figure, the period for sending the control signal is included in one cycle in which the right eye's image and left eye's image are displayed. The sending period may be based on plural cycles, instead of one cycle. FIG. 4(c) shows the signal utilized for controlling the shutter's open/close state and sent from the synchronizing circuit 202 to the right eye's shutter 204. When the synchronizing signal becomes H, the shutter is open and the viewer's right eye can see the right eye's image. When the synchronizing signal becomes L, the shutter is closed and the viewer's right eye cannot see the left eye's image. FIG. 4(d) shows the signal utilized for controlling the shutter's open/close state and sent from the synchronizing circuit 202 to the left eye's shutter 205. When the synchronizing signal becomes H, the shutter is open and the viewer's left eye can see the left eye's image. When the synchronizing signal becomes L, the shutter is closed and the viewer's left eye cannot see the right eye's image.

Based on the synchronizing circuit 202 of the stereoscopic eyewear 200, the mode change is performed to set a mode utilized for viewing the 3D image or a mode utilized for viewing the 2D image.

When the mode utilized for viewing the 3D mode is set, the synchronizing circuit 202 of the stereoscopic eyewear 200 controls the open/close timing of the right eye's shutter 204 utilized for viewing the right eye's image and left eye's shutter 205 utilized for viewing the left eye's image, in synchronization with the synchronizing signal received by the receiving unit 201. It is configured to perform the open/close operations for the right eye's shutter 204 and left eye's shutter 205 in accordance with the received synchronizing signal during the time when the synchronizing signal is continuously received. It is configured to keep the synchronizing signal being received before the control signal sending period and to make the synchronizing signal be self-propelled during the control signal sending period when the synchronizing signal is included in the control signal, because the synchronizing signal cannot be obtained.

It may be configured that the display unit 109 displays the image data of the viewer and stereoscopic eyewear 200 captured by the camera of the viewer detecting unit 101, with a message indicating "not registered yet, register soon" or the like for urging the registration, when a viewer and stereoscopic eyewear 200 not registered in the viewer/stereoscopic eyewear database 102 are detected. The notification to the non-registered viewer may be implemented by the display of icon on a part of the display unit 109. Alternatively, it may be configured that no notification is performed for the non-registered viewer and non-registered stereoscopic eyewear 200.

Figure 5A:
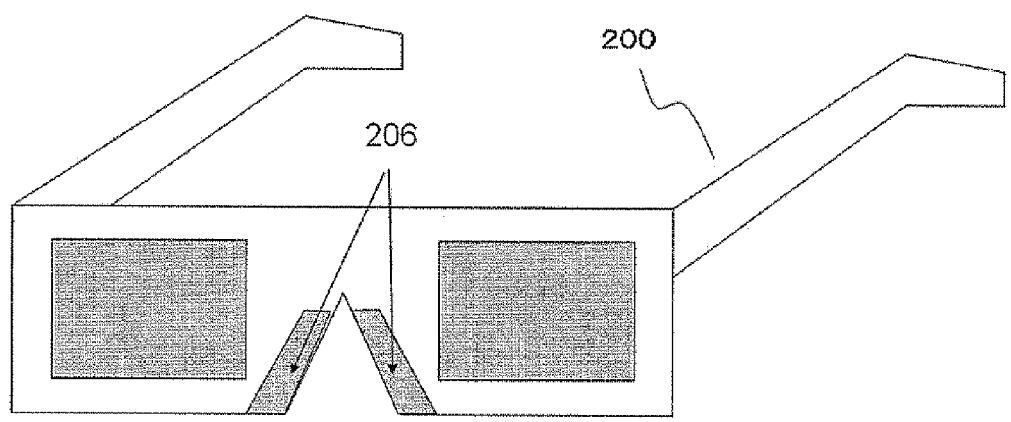
FIG. 5A is a view for explaining a wear/non-wear detecting unit of the eyewear regarding the stereoscopic-image display apparatus of the embodiment according to the present invention.
Figure 5B:
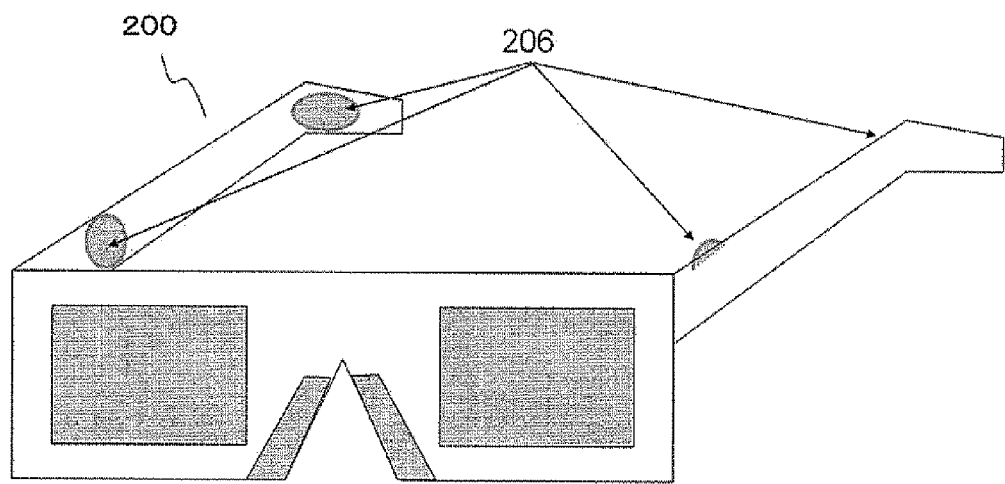
FIG. 5B is a view for explaining a wear/non-wear detecting unit of the eyewear regarding the stereoscopic-image display apparatus of the embodiment according to the present invention.
Figure 5C:
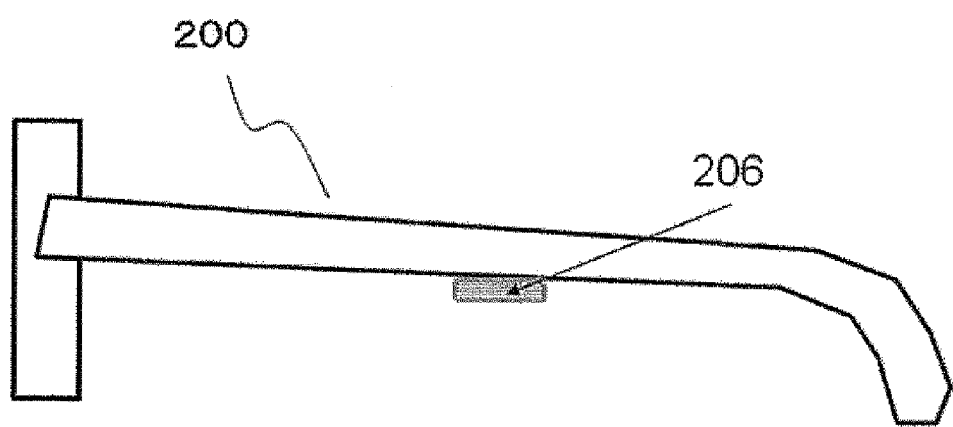
FIG. 5C is a view for explaining a wear/non-wear detecting unit of the eyewear regarding the stereoscopic-image display apparatus of the embodiment according to the present invention.

FIGS. 5A to 5C are views for explaining the wear/non-wear detecting unit 206 of the eyewear regarding the stereoscopic eyewear 200 of the embodiment according to the present invention. These figures show three examples of positions arranging the wear/non-wear detecting unit 206 on the stereoscopic eyewear 200. FIG. 5A shows an example in which the wear/non-wear detecting unit 206 is arranged on the nosepiece position. In that example, it detects whether or not electric current flows in a small push switch or the left and right nosepiece portions, to determine whether the viewer does or does not wear the stereoscopic eyewear 200. FIG. 5B shows an example in which the wear/non-wear detecting unit 206 is arranged on the frame of the stereoscopic eyewear 200 where the viewer's head skin contacts with. In that example, it detects the electric capacitance of the head's skin, to determine whether the viewer does or does not wear the stereoscopic eyewear 200. FIG. 5C shows an example in which the wear/non-wear detecting unit 206 is arranged on the frame of the stereoscopic eyewear 200 where the viewer's ear contacts with, i.e., the frame's portion where the frame rests on the ear. In that example, it detects whether or not electric current flows in a small push switch or detects the electric capacitance with a sensor provided for detecting the wear/not-wear condition, to determine whether the viewer does or does not wear the stereoscopic eyewear 200.

The wear/non-wear detecting unit 206 is configured as shown in FIGS. 5A to 5C. Thus, when the viewer wears the stereoscopic eyewear 200, the wear/non-wear detecting unit 206 detects that the viewer wears the stereoscopic eyewear 200 and then the power is supplied to each circuit of the stereoscopic eyewear 200. Based on the default setting, the start-up is performed on the stereoscopic eyewear 200 with the 3D mode utilized for viewing the 3D image. When it is detected that the viewer does not wear the stereoscopic eyewear 200, the power supply to each circuit of the stereoscopic eyewear 200 is stopped.

Assume the case that the viewers H1-H4 wear the eyewears 1-4 configured with the stereoscopic eyewear 200 according to the present invention when the stereoscopic-image display apparatus 100 according to the present invention displays the 3D image. In the assumption, the viewers H1-H3 can view the displayed 3D image as the 3D image based on the individual data, and the viewer 114 wearing the eyewear 4 can view the displayed 3D image as the 2D image based on the individual data.

As described above, the stereoscopic-image display apparatus 100 can automatically send the instruction for changing the 3D/2D modes to the stereoscopic eyewear 200 in accordance with the request of the viewer who views the 3D image. Therefore, the viewer who cannot view the 3D image and/or does not want to view the 3D image is able to view and enjoy the 2D image, even when other viewers are viewing the 3D image. In addition, the viewer who cannot view the 3D image and/or does not want to view the 3D image does not need to select the 2D image display after wearing the stereoscopic eyewear 200 at each time when the 3D image is displayed. Thus, the viewer who cannot view the 3D image and/or does not request to view the 3D image can comfortably view and enjoy the 2D image. Furthermore, in a case of no viewer wanting to view the 3D image with the stereoscopic-image display apparatus 100 according to the present invention wearing the stereoscopic eyewear 200, and in a case of all viewers wearing the stereoscopic eyewear 200 having a request to view the 2D image, the stereoscopic-image display apparatus 100 outputs any one of both right eye's image and left eye's image regarding the 3D image to the display unit 109. Therefore, the viewer can comfortably view the 2D image without wearing the stereoscopic eyewear 200, and it is very convenient.

The embodiment described above is merely an example, and the present invention is not necessarily limited to the example. For example, the stereoscopic-image display apparatus and stereoscopic eyewear is explained in the embodiment. However, the present invention is not limited to the stereoscopic-image display apparatus and stereoscopic eyewear. It is enough to output the 3D image signal and synchronizing signal, receive the synchronizing signal, and display the stereoscopic image to the viewer with an eyewear utilized for viewing the stereoscopic image. The present invention is broadly applicable to a device that can output or display for the 3D image signal, such as a 3D TV, 3D projector, digital video recorder, portable movie player, portable phone, car navigation system, portable or stational BD/BVD player, and PC, other than the stereoscopic-image display apparatus and stereoscopic eyewear.

Embodiment 2

The embodiment 2 relates to an example in which a priority is set for the plural viewers or plural stereoscopic eyewears 200 when the 2D image or 3D image is viewed with the stereoscopic-image display apparatus 100 by the plural viewers. The stereoscopic-image display apparatus 100 identifies the viewer whose priority is higher or the stereoscopic eyewear 200 whose priority is higher, and makes the display unit 109 display the image based on the mode corresponding to the identified viewer or the viewer wearing the identified stereoscopic eyewear 200.

The viewer/stereoscopic eyewear database (database) 102, which is the storing means, stores a viewer table and eyewear table in a predetermined region. The viewer table is utilized for managing the viewer's attribute, and the eyewear table is utilized for managing the attribute of the stereoscopic eyewear 200. It will be described below in detail about the viewer table and eyewear table.

Figure 7:
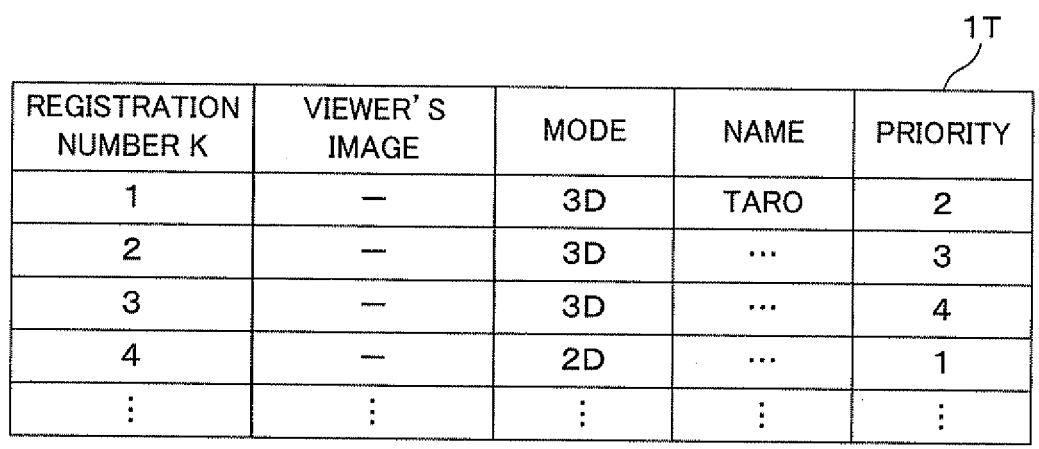
FIG. 7 is a view that shows an example of a record layout in a viewer table.

FIG. 7 is a view that shows an example of a record layout in a viewer table T1. The viewer table T1 includes the registration number K, viewer's image, mode, name and priority at each column. The registration number K is utilized for identifying the viewer who views the image displayed on the display unit 109 of the stereoscopic-image display apparatus 100. The registration number K is the primary key of the viewer table 1T.

The viewer's image is captured by the camera of the viewer detecting unit (detecting unit) 101. It is enough to store the image data of the viewer in the viewer/stereoscopic eyewear database 102, and thus it is not necessarily required to store the image data of the viewer in the viewer table T1. At that time, address or path regarding the image data of the viewer is stored in the column of the viewer's image.

The mode is information regarding the viewer's selection for viewing as the 2D image or 3D image when the image processing unit 108 detects that the image of the broadcast program received by the tuner unit 106 or the source image obtained by the external input unit 107 is the 3D image. For example, when the viewer requests to view the displayed 3D image as the 2D image, the character column representing the 2D is stored as the mode. On the other hand, when the viewer requests to view the displayed 3D image as the 3D image, the character column representing the 3D is stored as the mode. The viewing of the displayed 3D image as the 2D image means to view the right eye's image or left eye's image regarding the 3D image.

The name is the viewer's name.

When plural viewers are registered in the viewer table 1T, the priority represents the priority order for the viewers based on the mode. When the viewer detecting unit 101 detects the plural viewers, the stereoscopic-image display apparatus 100 makes the display unit 109 display the image corresponding to the mode of the viewer having the highest priority. The viewer whose priority is higher means the viewer whose priority is the highest of the plural viewers detected by the viewer detecting unit 101. For example, the priority is configured with numerals and the viewer having a stronger authority stores a smaller numeral in the priority. The same numeral is not set for different viewers as the priority.

Alternatively, the viewer having a stronger authority may store a larger numeral in the priority.

The viewer table 1T may further include columns for the age, height, sex, nickname, favorite category and the like.

FIG. 8 is a view that shows an example of a record layout in an eyewear table 2T. The eyewear table 2T includes columns for the registration number G, eyewear's image, mark position, serial number and priority. The registration number G is utilized for identifying the stereoscopic eyewear 200. The registration number G is the primary key in the eyewear table 2T.

The eyewear's image is an image of the stereoscopic eyewear 200 captured by the camera of the viewer detecting unit 101. It is enough to store the image data of the stereoscopic eyewear 200 in the viewer/stereoscopic eyewear database 102, and thus it is not necessarily required to store the image data of the stereoscopic eyewear 200 in the eyewear table T2. At that time, address or path regarding the image data of the stereoscopic eyewear 200 is stored in the column of the eyewear's image.

The mark position represents a position of the stereoscopic eyewear 200 where the individual selection mark portion MK is applied. For example, several positions of the stereoscopic eyewear 200 shown in FIGS. 3A to 3D are stored as the mark positions.

For example, the serial number is assigned at the manufacturing time of the stereoscopic eyewear 200.

The priority represents the priority order regarding the mode selection in the case that plural stereoscopic eyewears 200 are registered in the eyewear table 2T. When the viewer detecting unit 101 detects plural stereoscopic eyewears 200, the stereoscopic-image display apparatus 100 makes the display unit 109 display an image based on the mode for the viewer who wears the stereoscopic eyewear 200 having a higher priority. The stereoscopic eyewear 200 having a higher priority is the stereoscopic eyewear 200 having the highest priority of the plural stereoscopic eyewears 200 detected by the detecting unit 101. For example, the priority is configured with numerals, and a stereoscopic eyewear 200 having a higher priority stores a smaller numeral in the priority. The same numeral is not set for different stereoscopic eyewears 200 as the priority.

Alternatively, the viewer having a higher priority may store a larger numeral in the priority.

The eyewear table 2T may further include columns for the manufacture's name, model name, model number, color, year's type and the like.

Figure 9:
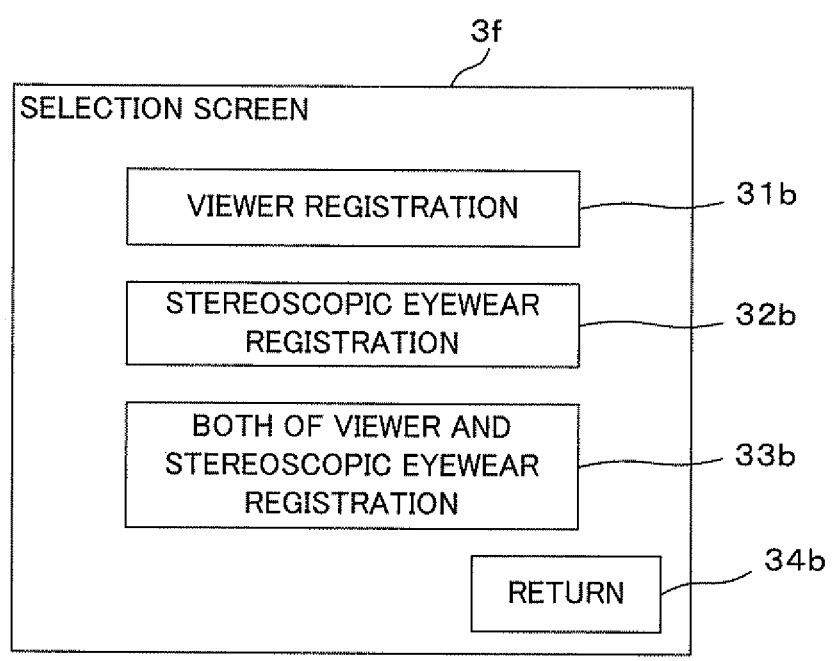
FIG. 9 is a view that shows an example of a selection screen.

FIG. 9 is a view that shows an example of a selection screen 3f. The selection screen 3f is a user interface utilized for respectively registering attribute information of the viewer and stereoscopic eyewear 200 in the viewer table 1T and eyewear table 2T. The controlling unit (viewer registering means, eyewear registering means, verifying means, and determining means) 103 makes the display unit 109 display the selection screen 3f when the registration button on the remote controller (not shown in figures) are pushed.

The selection screen 3f includes a viewer registration button 31b, stereoscopic eyewear registration button 32b, both of viewer and stereoscopic eyewear registration button 33b, and return button 34b. The viewer can manipulate several keys on the remote controller to select each button shown on the selection screen 3f and can push each of the selected buttons.

When the return button 34b is pushed, the controlling unit 103 stops the registration processing of the viewer or stereoscopic eyewear 200 for the viewer table 1T or eyewear table 2T, and makes the display unit 109 display an initial image. When a button other than the return button 34b is pushed, the controlling unit 103 sends the instruction to the viewer detecting unit 101 for zooming up the object, such as the viewer and stereoscopic eyewear 200, with the camera and capturing a registration image having an appropriate size.

When the viewer registration button 31b is pushed, the controlling unit 103 instructs the viewer detecting unit 101 to detect the viewer from the image captured by the camera, and to capture a zoomed image in which the entire of the viewer is shown on the screen. At that time, the viewer detecting unit 101 may extract the viewer's head portion from the image captured by the camera, and capture the image corresponding to the extracted viewer's head portion. Alternatively, the viewer detecting unit 101 may capture the image corresponding to the viewer's upper body portion. Alternatively, the viewer detecting unit 101 may capture the image having a predetermined size that is designated by the viewer.

Figure 10:
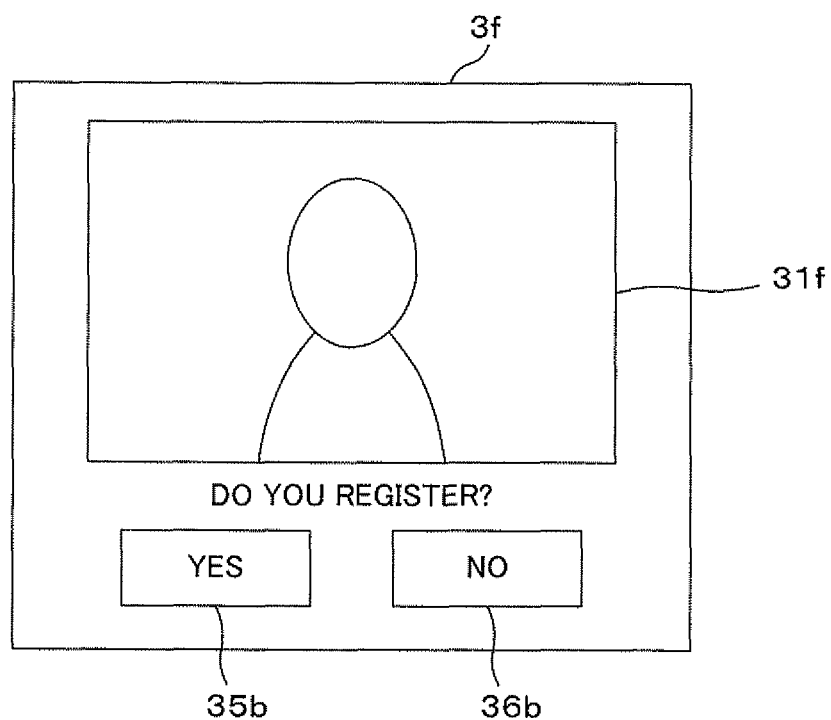
FIG. 10 is a view that shows an example of the selection screen.

FIG. 10 is a view that shows an example of the selection screen 3f, which is a confirmation screen for confirming to the viewer whether the procedure should be proceeded to perform the record registration processing in the viewer table 1T or eyewear table 2T, too. The confirmation screen includes a viewer screen 31f arranged at the upper portion of the screen, and a YES button 35b and NO button 36b arranged at the lower portion of the screen. The viewer screen 31f is a small screen for showing the viewer's image captured by the camera of the viewer detecting unit 101. When the NO button 36b is pushed, the controlling unit 103 makes the display unit 109 display the previous screen, i.e., the selection screen 3f of FIG. 9. When the YES button 35b is pushed, the controlling unit 103 makes the display unit 109 display the next screen.

Figure 11:
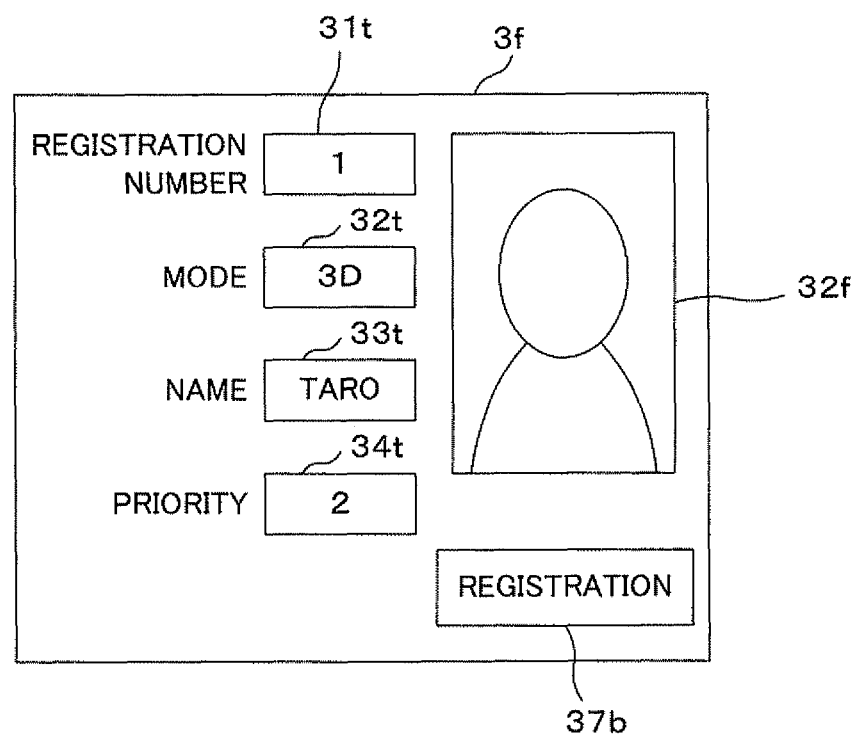
FIG. 11 is a view that shows an example of the selection screen.

FIG. 11 is a view that shows an example of the selection screen 3f. When the YES button 35b is pushed on the selection screen of FIG. 10, the controlling unit 103 makes the display unit 109 display the selection screen 3f of FIG. 11. FIG. 11 is further an input screen for inputting the record information registered in the viewer table 1T. The input screen includes a viewer screen 32f arranged at the upper right portion of the screen, a text box arranged at the left portion of the screen, and a registration button 37b arranged at the lower right portion of the screen. The text box arranged at the left portion of the screen includes a registration number text box 31t, mode text box 32t, name text box 33t and priority text box 34t.

The viewer screen 32f is a small screen for showing a viewer's screen that is captured by the camera of the viewer detecting unit 101. The viewer's image shown on the viewer screen 32f may be the same as or different from the viewer's image shown on the viewer screen 31f of FIG. 10. For example, the image shown on the viewer screen 32f may be the image in which the face portion of the viewer's image shown on the viewer screen 31f is enlarged further. The viewer's image shown on the viewer screen 32f is stored in the viewer table 1T as the viewer's image.

The registration number text box 31t, mode text box 32t, name text box 33t and priority text box 34t are screen controllers utilized for inputting information regarding the registration number K, mode, name and priority of the viewer table 1T, respectively. The viewer can manipulate the remote controller to input information required for these text boxes. The input information may be list typed list boxes, combo boxes or the like, which allow the input selection, instead of the text boxes.

When the registration button 37b is pushed, the controlling unit 103 registers the viewer's image and several attributes shown on the selection screen 3f of FIG. 11 into the viewer table 1T.

When the stereoscopic eyewear registration button 32b of FIG. 9 is pushed, the controlling unit 103 makes the display unit 109 display the selection screen 3f of FIG. 10. The controlling unit 103 makes the viewer detecting unit 101 detect the viewer's face shown in the image that is captured by the camera, and makes it display the face portion image of the viewer who wears the stereoscopic eyewear 200 onto the viewer screen 31f of FIG. 10.

Figure 12:
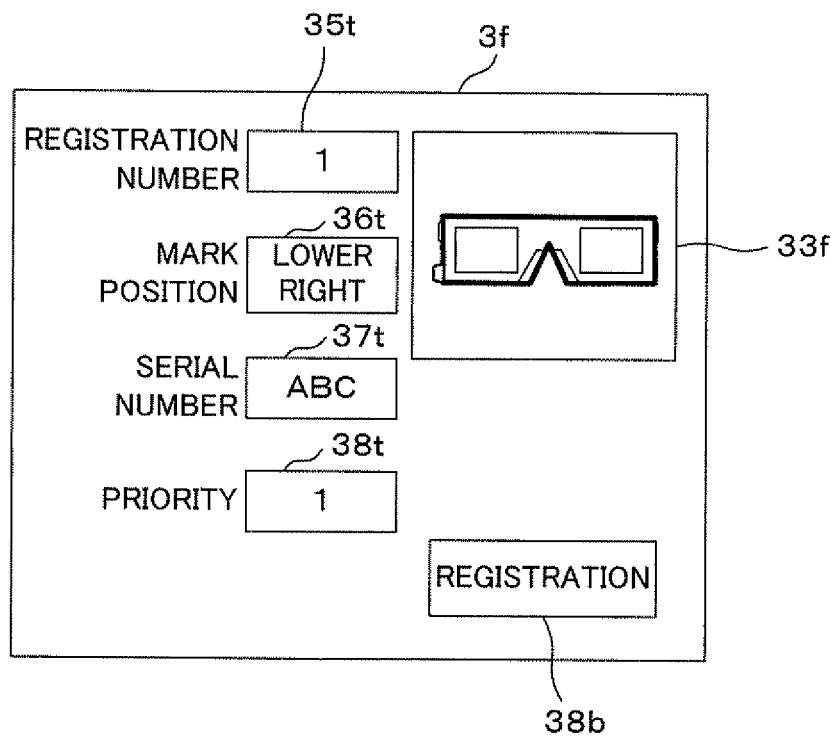
FIG. 12 is a view that shows an example of the selection screen.

FIG. 12 is a view that shows an example of the selection screen 3f. When the stereoscopic eyewear registration button 32b of FIG. 9 is pushed and further the YES button 35b of FIG. 10 is pushed, the controlling unit 103 makes the display unit 109 display the selection screen 3f of FIG. 12. FIG. 12 is the input screen utilized for inputting the record information registered in the eyewear table 2T, too. The input screen includes an eyewear screen 33f arranged at the upper right portion of the screen, a text box arranged at the left portion of the screen, and a registration button 38b arranged at the lower right portion of the screen. The text box arranged at the left portion of the screen includes a registration number text box 35t, mark position text box 36t, serial number text box 37t and priority text box 38t.

The eyewear screen 33f is a small screen for showing the stereoscopic eyewear 200 captured by the camera of the viewer detecting unit 101. The controlling unit 103 instructs the viewer detecting unit 101 to zoom up the portion of the stereoscopic eyewear 200 worn by the viewer who is captured by the camera. The controlling unit 103 displays the zoomed image of the stereoscopic eyewear 200 with an appropriate size onto the eyewear screen 33f. The image of the stereoscopic eyewear 200 shown on the eyewear screen 33f is stored in the eyewear table 2T as the eyewear's image.

The image of the stereoscopic eyewear 200 may be captured separately from the viewer's image. At that time, the controlling unit 103 instructs the viewer detecting unit 101 to capture the stereoscopic eyewear 200 itself, based on the manipulation signal from the remote controller, and displays the image of the stereoscopic eyewear 200 captured by the camera of the viewer detecting unit 101 onto the eyewear screen 33f.

The registration number text box 35t and mark position text box 36t are screen controllers utilized for inputting information regarding the registration number G and mark position in the eyewear table 2T, respectively. The serial number text box 37t and priority text box 38t are screen controllers utilized for inputting information regarding the serial number and priority in the eyewear table 2T, respectively. The viewer can manipulate the remote controller to input information required for those text boxes. The input information may be list typed list boxes, combo boxes or the like, which allow the input selection, instead of the text boxes.

When the registration button 38b is pushed, the controlling unit 103 registers the images and several attributes of the stereoscopic eyewear 200 shown on the selection screen 3f of FIG. 12 into the eyewear table 2T.

When the both of viewer and stereoscopic eyewear registration button 33b of FIG. 9 are pushed, the controlling unit 103 sequentially carries out the processing that is performed when the viewer registration button 31b of FIG. 9 is pushed, and the processing that is performed when the stereoscopic eyewear registration button 33b of FIG. 9 is pushed. At that time, the controlling unit 103 can firstly carries out any one of the processing that is performed when the viewer registration button 31b is pushed and processing that is performed when the stereoscopic eyewear registration button 33b is pushed.

Next, it will be described about the operation of the stereoscopic-image display apparatus 100. Firstly, it will be described about the operation in the case that the viewer having the higher priority is identified and the display unit 109 displays the image of mode corresponding to the identified viewer. Secondly, it will be described about the operation in the case that the stereoscopic eyewear 200 having the higher priority is identified and the display unit 109 displays the image of mode corresponding to the viewer who wears the identified stereoscopic eyewear 200.

Figure 13:
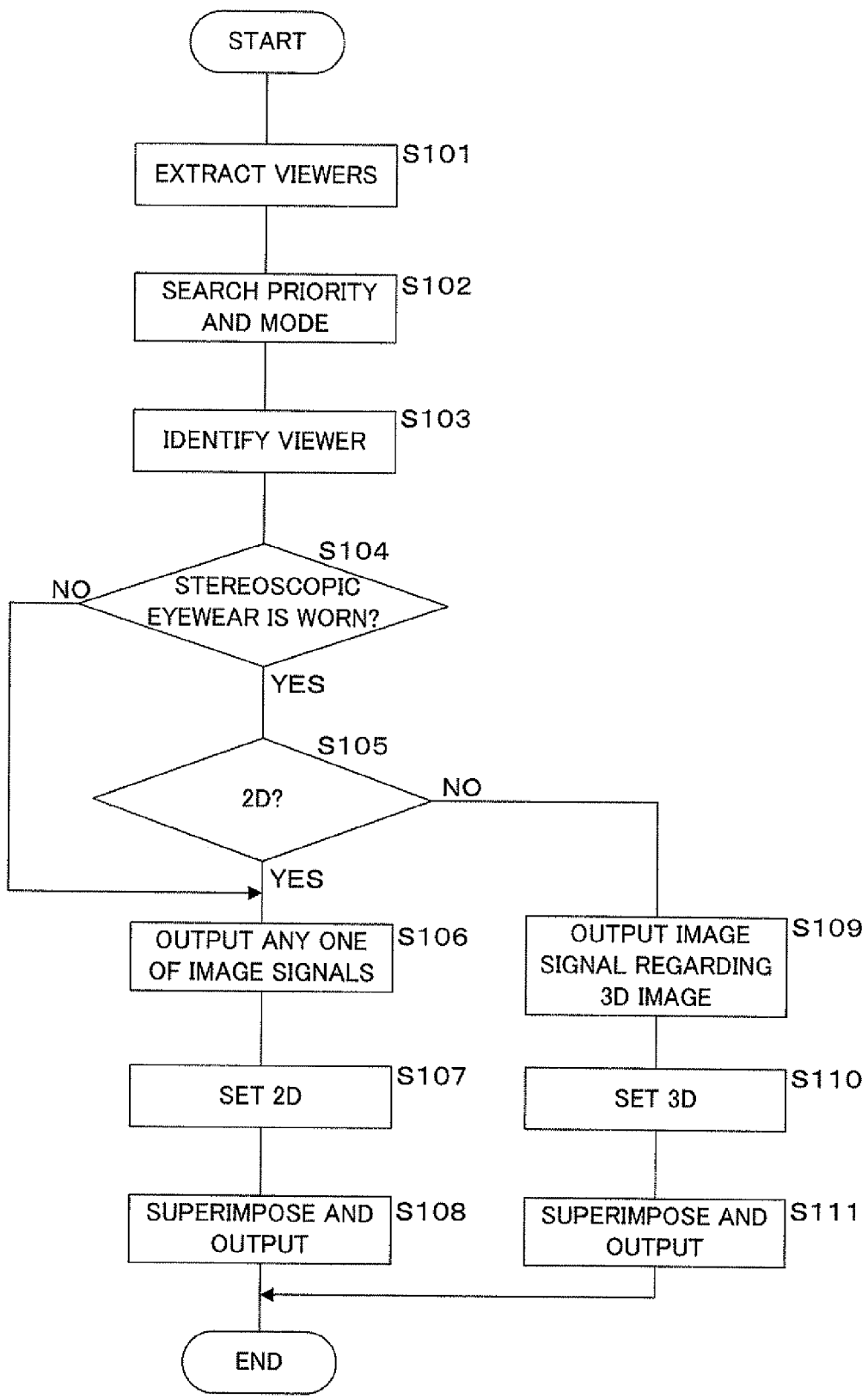
FIG. 13 is a flowchart that shows an example of a procedure performed by a controlling unit.

FIG. 13 is a flowchart that shows an example of a procedure performed by the controlling unit 103. The procedure shown in FIG. 13 identifies the viewer based on the priority and identifies the mode selected by the identified viewer.

When the image of the broadcast program received by the tuner unit 106 or source image obtained by the external input unit 107 is the 3D image, the controlling unit 103 makes the viewer detecting unit 101 regularly capture plural viewers and extract plural viewers from the captured image (step S101). Based on the image of each extracted viewer, the controlling unit 103 searches the priority and mode of the viewer corresponding to the viewer's image in the viewer table 1T (step S102).

At the step S102, the controlling unit 103 verifies whether or not the viewer in the viewer's image captured by the viewer detecting unit 101 is identical to the viewer in the viewer's image stored in the viewer's image column of the viewer table 1T. When the verification result represents that the viewers are identical, the controlling unit 103 extracts the viewer's priority and mode from the record of the viewer table 1T corresponding to the viewer captured by the viewer detecting unit 101.

The controlling unit 103 identifies the viewer having the highest priority of the extracted plural viewers (step S103). The controlling unit 103 determines whether or not the identified viewer having the highest priority wears the stereoscopic eyewear 200 (step S104). When having determined that the identified viewer having the highest priority does not wear the stereoscopic eyewear 200 (step S104: NO), the controlling unit 103 proceeds the procedure to the step S106.

When having determined that the identified viewer having the highest priority wears the stereoscopic eyewear 200 (step S104: YES), the controlling unit 103 determines whether the mode for the identified viewer having the highest priority is the 2D or not (step S105). When having determined that the mode for the identified viewer having the highest priority is the 2D (step S105: YES), the controlling unit 103 instructs the image processing unit 108 to output any one of the image signals regarding the right eye's image and left eye's image of the 3D image toward the display unit 109 (step S106). In addition, the controlling unit 103 sets the 2D mode in the control signal sent to the stereoscopic eyewear 200 (step S107). The controlling unit 103 superimposes the set control signal onto the synchronizing signal, outputs the superimposed synchronizing signal to the sending unit 105 (step S108) and ends the procedure.

When having determined that the mode for the identified viewer having the highest priority is not the 2D (step S105: NO), the controlling unit 103 instructs the image processing unit 108 to output the image signal regarding the 3D image to the display unit 109 (step S109). In addition, the controlling unit 103 sets the 3D mode in the control signal sent to the stereoscopic eyewear 200 (step S110). The controlling unit 103 superimposes the set control signal onto the synchronizing signal, outputs the superimposed synchronizing signal to the sending unit 105 (step S111) and ends the procedure.

Although the controlling unit 103 is described as the main processing unit in the above flow, it may be configured that the viewer detecting unit 101 works as the main processing unit.

The sending unit 105 of the stereoscopic-image display apparatus 100 receives the synchronizing signal on which the control signal is superimposed from the controlling unit, and sends the received synchronizing signal to the stereoscopic eyewear 200.

The receiving unit 201 of the stereoscopic eyewear 200 receives the synchronizing signal on which the control signal is superimposed from the sending unit 105, and separates into the synchronizing signal and control signal. The receiving unit 201 sends the separated control signal to the controlling unit 203, and sends the separated synchronizing signal to the synchronizing circuit 202. When the received control signal is the 2D mode, the controlling unit 203 instructs the synchronizing circuit 202 to synchronize with any one of the synchronizing signals regarding the right eye's image and left eye's image and to open the right eye's shutter 204 and left eye's shutter 205. Alternatively, the controlling unit 203 may turn off the power of the stereoscopic eyewear 200 when the control signal is 2D mode.

On the other hand, when the control signal is the 3D mode, the controlling unit 203 instructs the synchronizing circuit 202 to synchronize with the synchronizing signal and to alternately open and close the right eye's shutter 204 and left eye's shutter 205.

Figure 14:
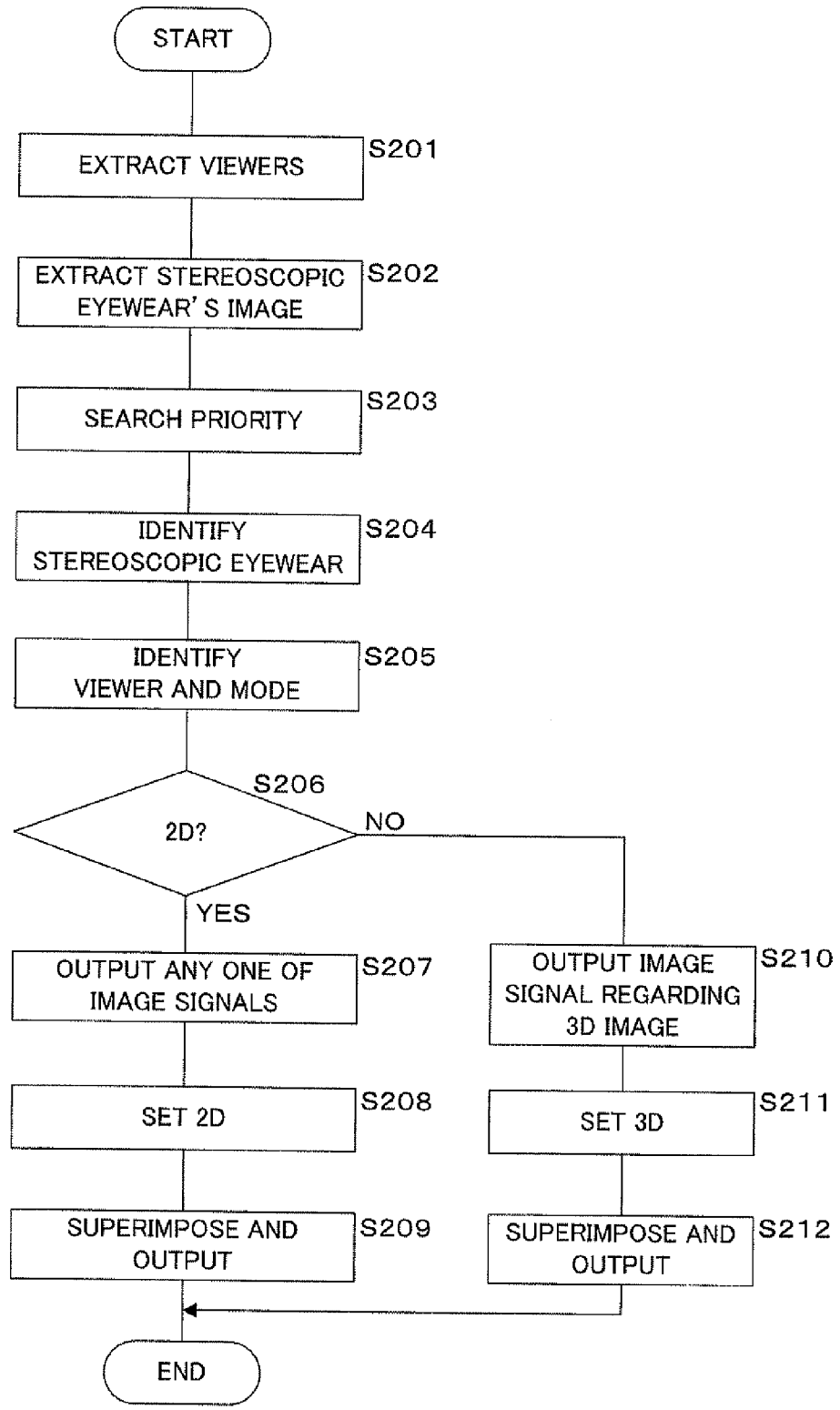
FIG. 14 is a flowchart that shows an example of a procedure performed by the controlling unit.

FIG. 14 is a flowchart that shows an example of a procedure performed by the controlling unit 103. The procedure of FIG. 14 identifies the stereoscopic eyewear 200 based on the priority, identifies the viewer who wears the identified stereoscopic eyewear 200 and identifies the mode selected by the identified viewer. It should be noted that the procedure of FIG. 14 is described in the case that all viewers wear the stereoscopic eyewear 200.

When the image of the broadcast received by the tuner unit 106 or source image obtained by the external input unit 107 is the 3D image, the controlling unit 103 makes the viewer detecting unit 101 regularly capture plural viewers and extract plural viewers from the captured image (step S201).

The controlling unit 103 extracts the image of the stereoscopic eyewear 200 worn by the viewer from the plural extracted viewer's images (step S202). Based on the extracted image of the stereoscopic eyewear 200, the controlling unit 103 searches the priority in the eyewear table 2T (step S203).

At the step S203, the controlling unit 103 verifies whether or not the stereoscopic eyewear 200 extracted from the image captured by the viewer detecting unit 101 is identical to the stereoscopic eyewear 200 stored in the eyewear's image column of the eyewear table 2T. When the verification result represents that the stereoscopic eyewears 200 shown in both images are identical, the controlling unit 103 extracts the priority of the stereoscopic eyewear 200 from the record of the eyewear table 2T corresponding to the stereoscopic eyewear 200 captured by the viewer detecting unit 101.

At the step S203, the controlling unit 103 may utilize the mark position of the eyewear table 2T for the verification described above. In the case that the position of the individual selection mark portion MK on the stereoscopic eyewear 200 is previously known, it is possible to perform faster the verification with the image of the extracted stereoscopic eyewear 200 and eyewear's image of the eyewear table 2T.

The controlling unit 103 identifies the stereoscopic eyewear 200 having the highest priority of the searched plural stereoscopic eyewears 200 (step S204). The controlling unit 103 searches the viewer who wears the identified stereoscopic eyewear 200 in the view table 1T, based on the captured image, and identifies the searched viewer and the mode for the identified viewer (step S205).

The procedure after the step S206 is similar to the procedure after the step S105 of FIG. 13, and the explanation for the procedure after the step S206 is omitted.

Although the controlling unit 103 is described as the main processing unit in the above flow, it may be configured that the viewer detecting unit 101 works as the main processing unit.

It may be configured that the viewer table 1T includes a weighting column based on the viewer. For example, the weighting is based on the viewer's age, viewer's viewing time or the like. When the viewer's attribute is registered in the viewer table 1T, the weighting based on the viewer is registered. Then, when the viewer is identified, the new priority in which the weighting has been applied is utilized for identifying the viewer. The stereoscopic-image display apparatus 100 may refer the mode corresponding to the viewer identified with the new priority to perform the change processing between the 2D image and 3D image for the image displayed on the display unit 109.

When the viewer having the higher priority wears the stereoscopic eyewear 200, the stereoscopic-image display apparatus 100 makes the display unit 109 display the image corresponding to the mode selected by the viewer having the higher priority. Therefore, the stereoscopic-image display apparatus 100 can automatically display any one of the 2D image and 3D image on the display unit 109, when the modes selected by the plural viewers are different from each other.

In addition, when the viewer having the stronger authority wears the stereoscopic eyewear 200 having the higher priority, the stereoscopic-image display apparatus 100 can lead the similar advantage as described above.

The stereoscopic-image display apparatus 100 can prevent the conflict for selecting the 2D image display or 3D image display among the plural viewers, although such an argument is similar to the conflict over which program to view. In the case that the priority for the viewer having the decisive power is set higher, the stereoscopic-image display apparatus 100 can prevent the argument for selecting the display mode because of automatically displaying the image based on the mode corresponding to the viewer having the higher priority. For example, additionally assume the case that plural viewers being the parent and child view the image. When the parent's priority is set higher or when the parent wears the stereoscopic eyewear 200 having the higher priority, the stereoscopic-image display apparatus 100 can prevent the child from viewing the 3D image for a longer period of time.

When the viewer having the higher priority does not wear the stereoscopic eyewear 200, the stereoscopic-image display apparatus 100 displays any one of the right eye's image and left eye's image regarding the 3D image on the display unit 109. Therefore, the stereoscopic-image display apparatus 100 can display the 2D image based on the selection of the viewer having the stronger authority on the display unit 109, even when there are plural viewers.

The embodiment 2 is as described above. The other things about the embodiment 2 are similar to the embodiment 1, and thus provided with the same reference numerals for the corresponding portions, and the detailed explanation about the other things is omitted.

Embodiment 3

The embodiment 3 relates to an example in which the viewer who wears the stereoscopic eyewear 200 having the highest priority is identified and the display unit 109 displays the image based on the mode corresponding to the identified viewer, when the priorities set for the plural viewers are the same.

FIG. 15 is a view showing another example of the record layout in the viewer table 1T. The priority of the viewer table 1T in the embodiment 3 can store the same priority for different viewers. For example, the priority of Taro whose registration number K=1 and priority of Hanako whose registration number K=4 are 1, in FIG. 15. On the other hand, the eyewear table 2T in the embodiment 3 stores the different priority for the different stereoscopic eyewear 200, similarly to the eyewear table 2T of FIG. 8 (see FIG. 8).

Assume the case that viewers, who are registered in the viewer table 1T of FIG. 15 and respectively have the registration numbers K=1, 2, 3, 4, view the image displayed on the display unit 109 of the stereoscopic-image display apparatus 10, together. In addition, assume the case that the viewers having the registration numbers K=1, 2, 3, 4 respectively wear the stereoscopic eyewears 200 having the registration numbers G=1, 2, 3, 4 mentioned in FIG. 8.

Taro having the registration number K=1 and Hanako having the registration number K=4 both have the priority being 1. However, the stereoscopic eyewear 200 having the registration number G=4 and worn by Hanako has the priority being 4, although the stereoscopic eyewear 200 having the registration number G=1 and worn by Taro has the priority being 1. Thus, the stereoscopic eyewear 200 worn by Taro has the higher priority than the stereoscopic eyewear 200 worn by Hanako.

In addition, the Taro's mode is the 2D and the Hanako's mode is the 3D (see FIG. 15). Thus, when the image of the broadcast program selected by the tuner unit 106 or the source image obtained by the external input unit 107 is the 3D image, the stereoscopic-image display apparatus 100 forcibly makes the display unit 109 display the image based on the 2D mode that has been previously selected by Taro. Anyway, the image based on the 2D mode is the right eye's image or left eye's image regarding the 3D image.

Figure 16:
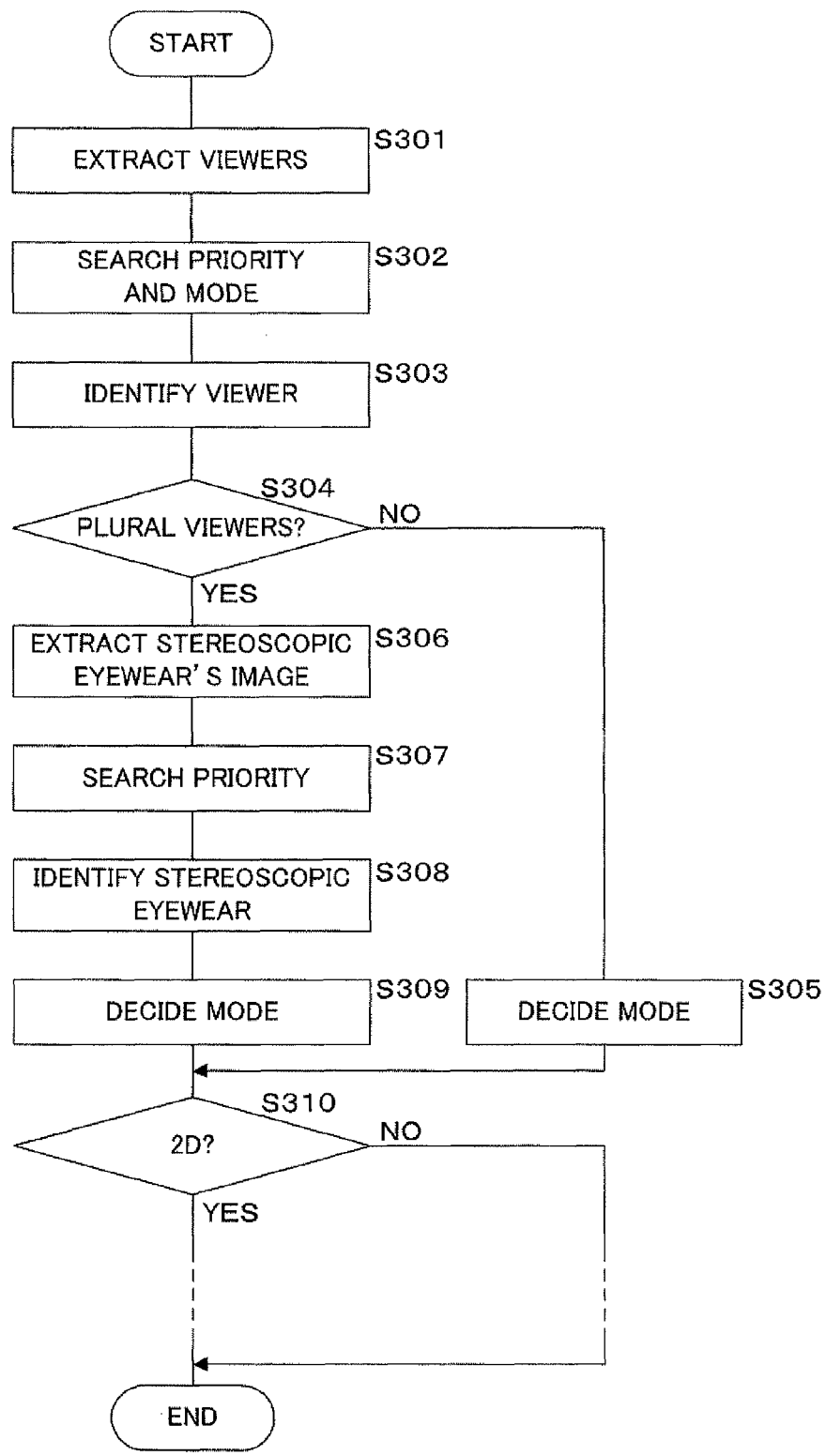
FIG. 16 is a flowchart that shows another example of the procedure preformed by the controlling unit.

FIG. 16 is a flowchart that shows another example of the procedure performed by the controlling unit 103.

When the image of the broadcast program received by the tuner unit 106 or the source image obtained by the external input unit 107 is the 3D image, the controlling unit 103 makes the viewer detecting unit 101 regularly capture plural viewers and extract plural viewers from the captured images (step S301). Based on the each image of the extracted plural viewers, the controlling unit 103 searches the priority and mode for the viewer corresponding to the viewer's image from the viewer table 1T (step S302).

The controlling unit 103 identifies the viewer having the highest priority of the extracted plural viewers (step S303). The controlling unit 103 determines whether the step S303 has identified plural viewers or not (step S304). When having determined that the step S303 has not identified plural viewers (step S304: NO), the controlling unit 103 decides the mode corresponding to the identified singular viewer as the mode utilized for the image displayed on the display unit 109 (step S305). Then, the controlling unit 103 proceeds the procedure to the step S310.

When having determined that the step S303 has identified plural viewers (step S304: YES), the controlling unit 103 extracts the image of the stereoscopic eyewear 200 worn by each viewer from the image of the identified plural viewers (step S306). Based on the each image of the extracted stereoscopic eyewears 200, the controlling unit 103 searches the priority in the eyewear table 2T (step S307).

The controlling unit 103 identifies the stereoscopic eyewear 200 having the highest priority based on the searched result (step S308). The controlling unit 103 decides that the mode for the viewer wearing the identified stereoscopic eyewear 200 as the mode utilized for the image displayed on the display unit 109 (step S309).

The procedure after the step S310 is the same as the procedure after the step S105 shown in FIG. 13, and the explanation is omitted. In addition, the flow after the step S310 is omitted in FIG. 16.

Although the controlling unit 103 is described as the main processing unit in the above flow, it may be configured that the viewer detecting unit 101 works as the main processing unit.

In the explanation described above, plural viewers having the same priority are firstly identified and the stereoscopic eyewear 200 is secondly identified. However, the sequence may be reversed. Particularly, it may be configured that plural stereoscopic eyewears 200 having the same priority are firstly identified and the viewer is secondly identified. In that configuration, it should make the priority of the eyewear table 2T be able to set the same priority for different stereoscopic eyewears 200, and should make the priority of the viewer table 1T be unable to set the same priority for different viewers.

The controlling unit 103 extracts the image of plural stereoscopic eyewears 200 from the image captured by the viewer detecting unit 101, and searches the priority in the eyewear table 2T based on the extracted image. When plural stereoscopic eyewears 200 have the highest priority, the controlling unit 103 extracts the image for each viewer wearing the stereoscopic eyewear 200. Based on the extracted image of each viewer, the controlling unit 103 searches the priority and mode in the viewer table 1T. The controlling unit 103 decides the mode corresponding to the viewer having the highest priority based on the searched result as the mode utilized for the image displayed on the display unit 109.

The stereoscopic-image display apparatus 100 can prevent the conflict regarding the display mode, even in the case that plural viewers have the same priority regarding the mode selection.

When the viewers have the same priority, the stereoscopic-image display apparatus 100 decides the mode utilized for the image displayed on the display unit 109, based on the priority set for the stereoscopic eyewear 200 worn by each viewer. Thus, it is possible to automatically decide the mode utilized for the image displayed on the display unit 109, in the case that the viewer having the higher priority wears the stereoscopic eyewear 200 having the higher priority. Therefore, the stereoscopic-image display apparatus 100 is convenient for the viewers.

The embodiment 3 is as described above. The other things about the embodiment 3 are similar to the embodiments 1 and 2, and thus provided with the same reference numerals for the corresponding portions, and the detailed explanation about the other things is omitted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

Industrial Applicability

The stereoscopic-image display apparatus and stereoscopic eyewear according to the present invention relates to the technique that can implement the display condition for the 3D image or 2D image requested by the individual viewer, without the viewer's burden for the changing manipulation.

EXPLANATION OF ITEM NUMBERS 100 stereoscopic-image display apparatus
101 viewer detecting unit (detecting unit)
102 viewer/stereoscopic eyewear database (database)
103 controlling unit (viewer registering means, eyewear registering means, verifying means, determining means)
105 sending unit
106 tuner unit
107 external input unit
108 image processing unit
109 display unit
200 eyewear 1-eyewear n stereoscopic eyewear
201 receiving unit
202 synchronizing circuit
203 controlling unit
204 right eye's shutter
205 left eye's shutter
206 wear/non-wear detecting unit
MK individual selection mark portion viewer H1-viewer H4, viewer
1T viewer table
2T eyewear table
3f selection screen

The invention claimed is:

1. A stereoscopic-image display apparatus that displays a stereoscopic image or a planar image on a screen which is a front portion of a display unit, comprising:
   an image processing unit that outputs an image signal regarding a stereoscopic image or a planar image to the display unit;
   a detecting unit that detects a viewer who views an image displayed on the screen and detects a stereoscopic eyewear which is arranged in front of the screen for viewing a stereoscopic image displayed on the screen;
   a database in which a viewer viewing an image displayed on the screen and an attribute information of the viewer including a display selection between a planar image and a stereoscopic image are registered in association with each other, and a stereoscopic eyewear utilized for viewing a stereoscopic image displayed on the screen and an attribute information of the stereoscopic eyewear are registered in association with each other;
   a verifying unit that verifies the viewer or the stereoscopic eyewear detected by the detecting unit and the viewer or the stereoscopic eyewear registered in the database; and
   a sending unit that sends a synchronizing signal, based on a result verified by the verifying unit, which is utilized for viewing the image displayed on the screen as a stereoscopic image, in order to generate a display condition associated with a viewer's attribute information stored in the database.

2. The stereoscopic-image display apparatus according to claim 1, wherein
   the detecting unit is configured to detect a viewer facing to the screen and a stereoscopic eyewear worn by the viewer in accordance with the database, and superimpose a control signal instructing a stereoscopic mode or a planar mode to the stereoscopic eyewear worn by the viewer onto the synchronizing signal in order to implement a display condition associated with the viewer's attribute information stored in the database.

3. The stereoscopic-image display apparatus according to claim 1, wherein
the detecting unit is configured to determine whether all of the detected viewers wear the stereoscopic eyewear or not, and the image processing unit is configured to output an image signal regarding any one of a right eye's image and a left eye's image for a stereoscopic image, when the detecting unit determines that none of the detected viewers is wearing the stereoscopic eyewear.

4. The stereoscopic-image display apparatus according to claim 1, wherein
the image processing unit is configured to output an image signal regarding any one of a right eye's image and a left eye's image for a stereoscopic image, when the attribute information for all viewers detected by the detecting unit are associated with a display selection of a planar image.

5. The stereoscopic-image display apparatus according to claim 2, wherein
the detecting unit is configured to determine whether all of the detected viewers wear the stereoscopic eyewear or not, and
the image processing unit is configured to output an image signal regarding any one of a right eye's image and a left eye's image for a stereoscopic image, when the detecting unit determines that none of the detected viewers is wearing the stereoscopic eyewear.

6. The stereoscopic-image display apparatus according to claim 2, wherein
the image processing unit is configured to output an image signal regarding any one of a right eye's image and a left eye's image for a stereoscopic image, when the attribute information for all viewers detected by the detecting unit are associated with a display selection of a planar image.

7. A stereoscopic-image display apparatus that displays a stereoscopic image or planar image on a screen which is a front portion of a display unit, comprising:
an image processing unit that outputs an image signal regarding a stereoscopic image or planar image to the display unit;
a detecting unit that detects a viewer who views an image displayed on the screen and that detects a stereoscopic eyewear arranged in front of the screen for viewing a stereoscopic image displayed on the screen;
a database in which a viewer viewing an image displayed on the screen and an attribute information of the viewer including a display selection of a planar image or a stereoscopic image are registered in association with each other, and a stereoscopic eyewear utilized for viewing a stereoscopic image displayed on the screen and an attribute information of the stereoscopic eyewear are registered in association with each other; and
a verifying unit that respectively verifies the viewer or the stereoscopic eyewear detected by the detecting unit and the viewer or the stereoscopic eyewear registered in the database, wherein
plural viewers viewing an image displayed on the screen and a priority among the plural viewers are registered in association with each other in the database,
the stereoscopic-image display apparatus comprises a determining unit that determines in accordance with a verification result of the verifying unit whether or not a viewer having the highest priority of the plural viewers detected by the detecting unit wears the stereoscopic eyewear, the image processing unit is configured to output an image signal regarding any one of a right eye's image and left eye's image of a stereoscopic image when the determining unit determines that the viewer having the highest priority of the viewers detected by the detecting unit does not wear the stereoscopic eyewear, and
the display unit is configured to display an image regarding the image signal output by the image processing unit onto the screen.

8. A stereoscopic-image display apparatus that displays a stereoscopic image or planar image on a screen which is a front portion of a display unit, comprising:
an image processing unit that outputs an image signal regarding a stereoscopic image or planar image on the display unit;
a detecting unit that detects a viewer who views an image displayed on the screen and that detects a stereoscopic eyewear arranged in front of the screen for viewing a stereoscopic image displayed on the screen;
a database in which a viewer viewing an image displayed on the screen and an attribute information of the viewer including a display selection of a planar image or a stereoscopic image are registered in association with each other and a stereoscopic eyewear utilized for viewing a stereoscopic image displayed on the screen and an attribute information of the stereoscopic eyewear are registered in association with each other;
a verifying unit that respectively verifies the viewer or stereoscopic eyewear detected by the detecting unit and the viewer or stereoscopic eyewear registered in the database; and
a sending unit that sends a synchronizing signal corresponding to the stereoscopic image displayed by the display unit, based on a result verified by the verifying unit, wherein
plural viewers viewing an image displayed on the screen and a priority among the plural viewers are registered in association with each other, in the database,
the stereoscopic-image display apparatus comprises a determining unit for determining in accordance with a result verified by the verifying unit whether or not a viewer having the highest priority of the plural viewers detected by the detecting unit wears the stereoscopic eyewear,
the image processing unit is configured to output an image signal regarding any one of a right eye's image and left eye's image of a stereoscopic image to the display unit when the determining unit determines that the viewer having the highest priority of the viewers detected by the detecting unit does not wear the stereoscopic eyewear,
the display unit is configured to display an image regarding the image signal output by the image processing unit on the screen, and
the sending unit is configured to send the synchronizing signal to the stereoscopic eyewear, on which a control signal about the selection of displaying the planar image or stereoscopic image registered in the database is superimposed.

9. A stereoscopic-image display apparatus that displays a stereoscopic image or planar image on a screen which is a front portion of a display unit, comprising:
an image processing unit that outputs an image signal regarding a stereoscopic image or planar image on the display unit;
a detecting unit that detects a viewer who views an image displayed on the screen, and that detects a stereoscopic eyewear arranged in front of the screen for viewing a stereoscopic image displayed on the screen;

a database in which a viewer viewing an image displayed on the screen and an attribute information of the viewer including a display selection of a planar image or a stereoscopic image are registered in association with each other, and a stereoscopic eyewear utilized for viewing a stereoscopic image displayed on the screen and an attribute information of the stereoscopic eyewear are registered in association with each other; and a verifying unit that respectively verifies the viewer or stereoscopic eyewear detected by the detecting unit and the viewer or stereoscopic eyewear registered in the database, wherein plural viewers viewing an image displayed on the screen and a priority among the plural viewers are registered in association with each other, in the database, the image processing unit is configured to output an image signal regarding any one of a rights eye's image and left eye's image of the stereoscopic image to the display unit in accordance with a result verified by the verifying unit when a viewer having the highest priority of the plural viewers detected by the detecting unit is associated with the selection of displaying the planar image, and the display unit is configured to display an image regarding the image signal output by the image processing unit on the screen.

10. A stereoscopic-image display apparatus that displays a stereoscopic image or planar image on a screen which is a front portion of a display unit, comprising:

an image processing unit that outputs an image signal regarding a stereoscopic image or planar image to the display unit;

a detecting unit that detects a viewer who views an image displayed on the screen, and that detects a stereoscopic eyewear arranged in front of the screen for viewing a stereoscopic image displayed on the screen;

a database in which a viewer viewing an image displayed on the screen and an attribute information of the viewer including a display selection of a planar image or a stereoscopic image are registered in association with each other, and a stereoscopic eyewear utilized for viewing a stereoscopic image displayed on the screen and an attribute information of the stereoscopic eyewear are registered in association with each other; and a verifying unit that respectively verifies the viewer or stereoscopic eyewear detected by the detecting unit and the viewer or stereoscopic eyewear registered in the database , wherein plural stereoscopic eyewears utilized for viewing a stereoscopic image displayed on the screen and a priority among the plural stereoscopic eyewears are registered in association with each other in the database, the image processing unit is configured to output an image signal regarding any one of a right eye's image and left eye's image of a stereoscopic image in accordance with a result verified by the verifying unit, when a viewer who wears a stereoscopic eyewear having the highest priority of the plural stereoscopic eyewears detected by the detecting unit is associated with the selection of displaying the planar image, and the display unit is configured to display an image regarding the image signal output by the image processing unit on the screen.

11. A stereoscopic-image display apparatus that displays a stereoscopic image or planar image on a screen which is a front portion of a display unit, comprising:

an image processing unit that outputs an image signal regarding a stereoscopic image or planar image to the display unit;

a detecting unit that detects a viewer who views an image displayed on the screen, and that detects a stereoscopic eyewear arranged in front of the screen for viewing a stereoscopic image displayed on the display unit;

a database in which a viewer viewing an image displayed on the screen and an attribute information of the viewer including a display selection of a planar image or a stereoscopic image are registered in association with each other and a stereoscopic eyewear utilized for viewing a stereoscopic image displayed on the screen and an attribute information of the stereoscopic eyewear are registered in association with each other;

a verifying unit that respectively verifies the viewer or stereoscopic eyewear detected by the detecting unit and the viewer or stereoscopic eyewear registered in the database; and a sending unit that sends a synchronizing signal corresponding to a stereoscopic image displayed by the screen to the stereoscopic eyewear, in accordance with a result verified by the verifying unit, wherein plural viewers viewing an image displayed in the screen and a priority among the plural viewers are registered in association with each other into the database, and plural stereoscopic eyewears utilized for viewing a stereoscopic image displayed on the screen and a priority among the plural stereoscopic eyewears are registered in association with each other into the database, the image processing unit is configured to output an image signal regarding any one of a right eye's image and left eye's image of a stereoscopic image to the display unit in accordance with a result verified by the verifying unit, when plural viewers have the highest priority of the plural viewers detected by the detecting unit and a viewer who wears a stereoscopic eyewear having the highest priority among the plural viewers is associated with the selection of displaying the planar image, the display unit is configured to display an image regarding the image signal output by the image processing unit on the screen, and the sending unit is configured to send the synchronizing signal to the stereoscopic eyewear, in which a control signal corresponding to the selection of displaying the planar image or stereoscopic image registered in the database is superimposed.

12. A stereoscopic-image display apparatus, including a processor, that can display about stereoscopic image signals on a display unit, comprising:

an image processing unit that outputs a stereoscopic image or a planar image to the display unit;

a viewer detecting unit that detects a viewer who views the stereoscopic image;

a viewer registering unit that registers, by the processor, individual data detected by the viewer detecting unit;

an eyewear registering unit that registers, by the processor, individual data of a stereoscopic eyewear utilized for viewing the stereoscopic image;

a viewer/stereoscopic eyewear database that manages the individual data of the viewer and the individual data of the stereoscopic eyewear; and a sending unit that sends a synchronizing signal, based on a verification result of the viewer/stereoscopic eyewear database, which is utilized for viewing a stereoscopic image signal as a stereoscopic image.

13. The stereoscopic-image display apparatus according to claim 12, wherein the viewer detecting unit detects a viewer facing to the display unit and the stereoscopic eyewear worn by the viewer in accordance with the viewer/stereoscopic eyewear database, and superimposes a control signal instructing a stereoscopic image mode or a planar image mode to the stereoscopic eyewear worn by the viewer onto the synchronizing signal in order to implement a display condition required by the viewer, in accordance with a relationship information of the viewer stored in the viewer/stereoscopic eyewear database.

14. The stereoscopic-image display apparatus according to claim 12, wherein the image processing unit outputs any one of a right eye's image and a left eye's image as the stereoscopic image, when the viewer detecting unit determines that none of the viewers detected by the viewer detecting unit wear the stereoscopic eyewear.

15. The stereoscopic-image display apparatus according to claim 12, wherein the image processing unit outputs any one of a right eye's image and a left eye's image as the stereoscopic image, when the viewer detecting unit determines that all of the viewers detected by the viewer detecting unit require a planar image display.

16. The stereoscopic-image display apparatus according to claim 12, further comprising:

a detecting unit that detects a viewer who views an image displayed on the display unit and that detects a stereoscopic eyewear for viewing a stereoscopic image displayed on the display unit;

a database that registers attribute information of the viewer and the stereoscopic eyewear;

the viewer registering unit registering the viewer detected by the detecting unit into the database;

the eyewear registering unit registering the stereoscopic eyewear detected by the detecting unit into the database; and a verifying unit that verifies, by the processor, the attribute information registered in the database, based on the viewer or the stereoscopic eyewear detected by the detecting unit, wherein the viewer registering unit is configured to associate and register a priority among the viewers detected by the detecting unit into the database, the stereoscopic-image display apparatus comprises a determining unit that determines, by the processor, in accordance with a verification result of the verifying unit whether or not a viewer having the highest priority of the viewers detected by the detecting unit wears the stereoscopic eyewear, the image processing unit is configured to output an image signal regarding a right eye's image or left eye's image of a stereoscopic image when the determining unit determines that the viewer having the highest priority of the viewers detected by the detecting unit does not wear the stereoscopic eyewear, and the display unit is configured to display an image regarding the image signal output by the image processing unit.

17. The stereoscopic-image display apparatus according to claim 12, further comprising:

a detecting unit that detects a viewer who views an image displayed on the display unit and that detects a stereoscopic eyewear for viewing a stereoscopic image displayed on the display unit;

a database that registers attribute information of the viewer and stereoscopic eyewear;

the viewer registering unit registering the viewer detected by the detecting unit into the database;

the eyewear registering unit registering the stereoscopic eyewear detected by the detecting unit;

a verifying unit that verifies, by the processor, attribute information registered in the database, based on the viewer or stereoscopic eyewear detected by the detecting unit; and the sending unit sending the synchronizing signal corresponding to the stereoscopic image displayed by the display unit, based on a result verified by the verifying unit, wherein the viewer registering unit is configured to register viewers detected by the detecting unit, a priority among the viewers, and a selection of displaying a planar image or a stereoscopic image, in association with each other, into the database, the stereoscopic-image display apparatus comprises a determining unit that determines, by the processor, in accordance with a result verified by the verifying unit whether or not a viewer having the highest priority of the viewers detected by the detecting unit wears the stereoscopic eyewear, the image processing unit is configured to output an image signal regarding a right eye's image or left eye's image of a stereoscopic image to the display unit when the determining unit determines that the viewer having the highest priority of the viewers detected by the detecting unit does not wear the stereoscopic eyewear, the display unit is configured to display an image regarding the image signal output by the image processing unit, and the sending unit is configured to send the synchronizing signal to the stereoscopic eyewear, on which a control signal about the selection of displaying the planar image or stereoscopic image registered in the database is superimposed.

18. The stereoscopic-image display apparatus according to claim 12, further comprising:

a detecting unit that detects a viewer who views an image displayed on the display unit, and that detects a stereoscopic eyewear utilized for viewing a stereoscopic image displayed on the display unit;

a database that registers attribute information of the viewer and the stereoscopic eyewear;

the viewer registering unit registering the viewer detected by the detecting unit in the database;

the eyewear registering unit means registering the stereoscopic eyewear detected by the detecting unit in the database; and a verifying unit that verifies, by the processor, attribute information registered in the database, in accordance with the viewer or stereoscopic eyewear detected by the detecting unit, wherein the viewer registering unit is configured to register viewers detected by the detecting unit, a priority among the viewers, and a selection of displaying a planar image or stereoscopic image, in association with each other, into the database, the image processing unit is configured to output an image signal regarding a rights eye's image or left eye's image of the stereoscopic image to the display unit in accordance with a result verified by the verifying unit means when a viewer having the highest priority of the viewers detected by the detecting unit is associated with the selection of displaying the planar image, and the display unit is configured to display an image regarding the image signal output by the image processing unit.

19. The stereoscopic-image display apparatus according to claim 12, further comprising:

a detecting unit that detects a viewer who views an image displayed on the display unit, and that detects a stereoscopic eyewear utilized for viewing a stereoscopic image displayed on the display unit;

a database that registers attribute information of the viewer and the stereoscopic eyewear;

the viewer registering unit registering the viewer detected by the detecting unit in the database;

the eyewear registering unit registering the stereoscopic eyewear detected by the detecting unit in the database; and a verifying unit that verifies, by the processor, attribute information registered in the database, in accordance with the viewer or stereoscopic eyewear detected by the detecting unit, wherein the viewer registering unit is configured to register the viewer detected by the detecting unit and a selection of displaying a planar image or stereoscopic image in association with each other into the database, the eyewear registering unit is configured to register stereoscopic eyewears detected by the detecting unit and a priority among the stereoscopic eyewears in association with each other into the database, the image processing unit is configured to output an image signal regarding a right eye's image or left eye's image of a stereoscopic image in accordance with a result verified by the verifying unit, when a viewer who wears a stereoscopic eyewear having the highest priority of the stereoscopic eyewears detected by the detecting unit is associated with the selection of displaying the planar image, and the display unit is configured to display an image regarding the image signal output by the image processing unit.

20. The stereoscopic-image display apparatus according to claim 12, further comprising:

a detecting unit that detects a viewer who views an image displayed on the display unit, and that detects a stereoscopic eyewear utilized for viewing a stereoscopic image displayed on the display unit;

a database that registers attribute information of the viewer and the stereoscopic eyewear;

the viewer registering unit registering the viewer detected by the detecting unit in the database;

the eyewear registering unit registering the stereoscopic eyewear detected by the detecting unit in the database;

a verifying unit that verifies, by the processor, attribute information registered in the database, in accordance with the viewer or stereoscopic eyewear detected by the detecting unit; and the sending unit sending the synchronizing signal corresponding to a stereoscopic image displayed by the display unit to the stereoscopic eyewear, in accordance with a result verified by the verifying unit, wherein the viewer registering unit is configured to register viewers detected by the detecting unit, a priority among the viewers, and a selection of displaying a planar image or stereoscopic image in association with each other into the database, the eyewear registering unit is configured to register stereoscopic eyewears detected by the detecting unit and a priority among the stereoscopic eyewears in association with each other into the database, the image processing unit is configured to output an image signal regarding a right eye's image or left eye's image of a stereoscopic image to the display unit in accordance with a result verified by the verifying unit, when plural viewers have the highest priority of the viewers detected by the detecting unit and a viewer who wears a stereoscopic eyewear having the highest priority among the plural viewers is associated with the selection of displaying the planar image, the display unit is configured to display an image regarding the image signal output by the image processing unit, and the sending unit is configured to send the synchronizing signal to the stereoscopic eyewear, in which a control signal corresponding to the selection of displaying the planar image or stereoscopic image registered in the database is superimposed.

21. The stereoscopic-image display apparatus according to claim 12, wherein the stereoscopic eyewear has an individual selection mark portion that makes the stereoscopic eyewear distinguishable from another stereoscopic eyewear with images captured from a front surface of these stereoscopic eyewear.

22. The stereoscopic-image display apparatus according to claim 21, wherein the individual selection mark portion is arranged on the front surface of the stereoscopic eyewear.

23. The stereoscopic-image display apparatus according to claim 21, wherein the individual selection mark portion is arranged on a side surface portion of a frame included in the stereoscopic eyewear to make the stereoscopic eyewear become distinguishable with a shape of the frame.

* * * * *